(12) United States Patent
Kira

(10) Patent No.: US 7,213,243 B2
(45) Date of Patent: May 1, 2007

(54) PROGRAM OPTIMIZATION BY UNUSED DATA ITEM

(75) Inventor: Masanori Kira, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 548 days.

(21) Appl. No.: 10/669,570

(22) Filed: Sep. 25, 2003

(65) Prior Publication Data

US 2004/0064808 A1 Apr. 1, 2004

(30) Foreign Application Priority Data

Sep. 30, 2002 (JP) ............................ 2002-285046

(51) Int. Cl.
*G06F 9/45* (2006.01)
(52) U.S. Cl. ..................... 717/159; 717/151
(58) Field of Classification Search ................ 717/151, 717/152, 155, 156, 157, 159
See application file for complete search history.

(56) References Cited

U.S. PATENT DOCUMENTS

| | | | | |
|---|---|---|---|---|
| 5,983,020 | A * | 11/1999 | Sweeney et al. ............. | 717/141 |
| 6,301,700 | B1 * | 10/2001 | Choi et al. .................... | 717/116 |
| 6,636,866 | B1 * | 10/2003 | Ramalingam ........... | 707/103 R |
| 7,003,507 | B2 * | 2/2006 | Tip et al. ........................ | 707/2 |
| 2004/0034754 | A1 * | 2/2004 | Schreiber .................... | 711/165 |

FOREIGN PATENT DOCUMENTS

JP 07023978 1/1995

OTHER PUBLICATIONS

Chen, Zhenqiang; Xu, Baowen; "Slicing Object-Oriented Java Programs", p. 33-40, ACM Apr. 2001, retrieved Jun. 21, 2006.*
Choi, Jong-Deok; Field, John; Ramalingam, G; "Slicing Class Hierarchies in C++", p. 179-197, ACM 1996, retrieved Jun. 21, 2006.*
Tip, Frank; Sweeney, Peter F.; "Class Hierarchy Specialization", p. 271-285, ACM 1997, retrieved Jun. 21, 2006.*
Snelting, Gregor; Tip, Frank; "Understanding Class Hierarchies Using Concept Analysis", ACM, May 2000, retrieved Jun. 21, 2006.*

* cited by examiner

*Primary Examiner*—Mary Steelman
(74) *Attorney, Agent, or Firm*—Staas & Halsey LLP

(57) ABSTRACT

An optimizing apparatus includes a data item extraction unit, a layout unit, an unused data item extraction unit, a merge determination unit, and a data item merge unit. The data item extraction unit extracts data items from a program. The layout unit lays out the extracted data item in memory. The unused data item extraction unit extracts defined but unused data items from the extracted data items. The merge determination unit determines based on the layout result whether or not a plurality of unused data items forming a data item having a hierarchical structure can be merged into a new data item. The data item merge unit merges the plurality of data items into a data item based on the determination result.

17 Claims, 37 Drawing Sheets

OPTIMIZING APPARATUS 1

```
000010 IDENTIFICATION  DIVISION.
000020 PROGRAM-ID.      PRG1.
000030
000040 ENVIRONMENT      DIVISION.
000050 INPUT-OUTPUT     SECTION.
000060 FILE-CONTROL.
000070     SELECT IFILE01 ASSIGN SYSIN
000080 .
000090
000100 DATA             DIVISION.
000110 FILE             SECTION.
000120 FD   IFILE01.
000130 01   IREC01.                    *>UNUSED
000140    03   IDATA11  PIC X(20). *>UNUSED
000150    03   IDATA12  PIC X(20). *>UNUSED
000160    03   IDATA13  PIC X(20). *>UNUSED
000170    03   IDATA14  PIC X(20). *>UNUSED
000180 WORKING-STORAGE  SECTION.
000190 01 WREC01.
000200    03   WDATA11  PIC 9(02).
000210    03   WDATA12  PIC 9(02). *>UNUSED
000220    03   WDATA13  PIC 9(02). *>UNUSED
000230    03   WDATA14  PIC 9(02).
000240 01 WREC02.                      *>UNUSED
000250    03   WDATA21  PIC X(40). *>UNUSED
000260    03   WDATA22  PIC X(40). *>UNUSED
000270 77 WDATA71       PIC 9(02). *>UNUSED
000280 77 WDATA72       PIC 9(02).
000290
000300 PROCEDURE        DIVISION.
000310     MOVE  1 TO WDATA11 OF WREC01.
000320     MOVE  2 TO WDATA14 OF WREC01.
000330     COMPUTE WDATA72 = WDATA11 OF WREC01 + WDATA14 OF WREC01.
000340     DISPLAY  WDATA72.
000350     STOP RUN.
```

FIG. 1 (RELATED ART)

```
000010 IDENTIFICATION  DIVISION.
000020 PROGRAM-ID.      PRG1.
000030
000040 ENVIRONMENT      DIVISION.
000050 INPUT-OUTPUT     SECTION.
000060 FILE-CONTROL.
000070     SELECT IFILE01 ASSIGN SYSIN
000080 .
000090
000100 DATA             DIVISION.
000110 FILE             SECTION.
000120 FD   IFILE01.
000130 01   IREC01.                  *>UNUSED
000140   03   IDATA11  PIC X(20).    *>UNUSED
000150   03   IDATA12  PIC X(20).    *>UNUSED
000160   03   IDATA13  PIC X(20).    *>UNUSED
000170   03   IDATA14  PIC X(20).    *>UNUSED
000180 WORKING-STORAGE  SECTION.
000190 01 WREC01.
000200   03   WDATA11  PIC 9(02).
000210   03   WDATA12  PIC 9(02).    *>UNUSED
000220   03   WDATA13  PIC 9(02).    *>UNUSED
000230   03   WDATA14  PIC 9(02).
000240* DELETED
000250* DELETED
000260* DELETED
000270* DELETED
000280 77 WDATA72      PIC 9(02).
000290
000300 PROCEDURE        DIVISION.
000310     MOVE  1 TO WDATA11 OF WREC01.
000320     MOVE  2 TO WDATA14 OF WREC01.
000330     COMPUTE WDATA72 = WDATA11 OF WREC01 + WDATA14 OF WREC01.
000340     DISPLAY  WDATA72.
000350     STOP RUN.
```

FIG. 2 (RELATED ART)

```
include <stdio.h> struct {
   char   idata11[20];     /*UNUSED*/
   char   idata12[20];     /*UNUSED*/
   char   idata13[20];     /*UNUSED*/
   char   idata14[20];     /*UNUSED*/
} irec01;                  /*UNUSED*/ void main(void) {
   struct {
      short wdata11;
      short wdata12;       /*UNUSED*/
      short wdata13;       /*UNUSED*/
      short wdata14;
   } wrec01;

struct {
      char   wdata21[40];  /*UNUSED*/
      char   wdata22[40];  /*UNUSED*/
   } wrec02;               /*UNUSED*/ short wdata71;          /*UNUSED*/
   short wdata72;

wrec01.wdata11 = 1;
   wrec01.wdata14 = 2;
   wdata72 = wrec01.wdata11 + wrec01.wdata14;
   printf("%d\n", wdata72);
}
```

FIG. 3 (RELATED ART)

```
include <stdio.h> struct {
    char    idata11[20];    /*DELETED*/
    char    idata12[20];    /*DELETED*/
    char    idata13[20];    /*DELETED*/
    char    idata14[20];    /*DELETED*/
} irec01;                   /*DELETED*/ void main(void) {
    struct {
        short wdata11;
        short wdata12;      /*UNUSED*/
        short wdata13;      /*UNUSED*/
        short wdata14;
    } wrec01;

/* DELETED */
/* DELETED */
/* DELETED */
/* DELETED */

/* DELETED */
    short wdata72;

wrec01.wdata11 = 1;
    wrec01.wdata14 = 2;
    wdata72 = wrec01.wdata11 + wrec01.wdata14;
    printf("%d\n", wdata72);
}
```

FIG. 4 (RELATED ART)

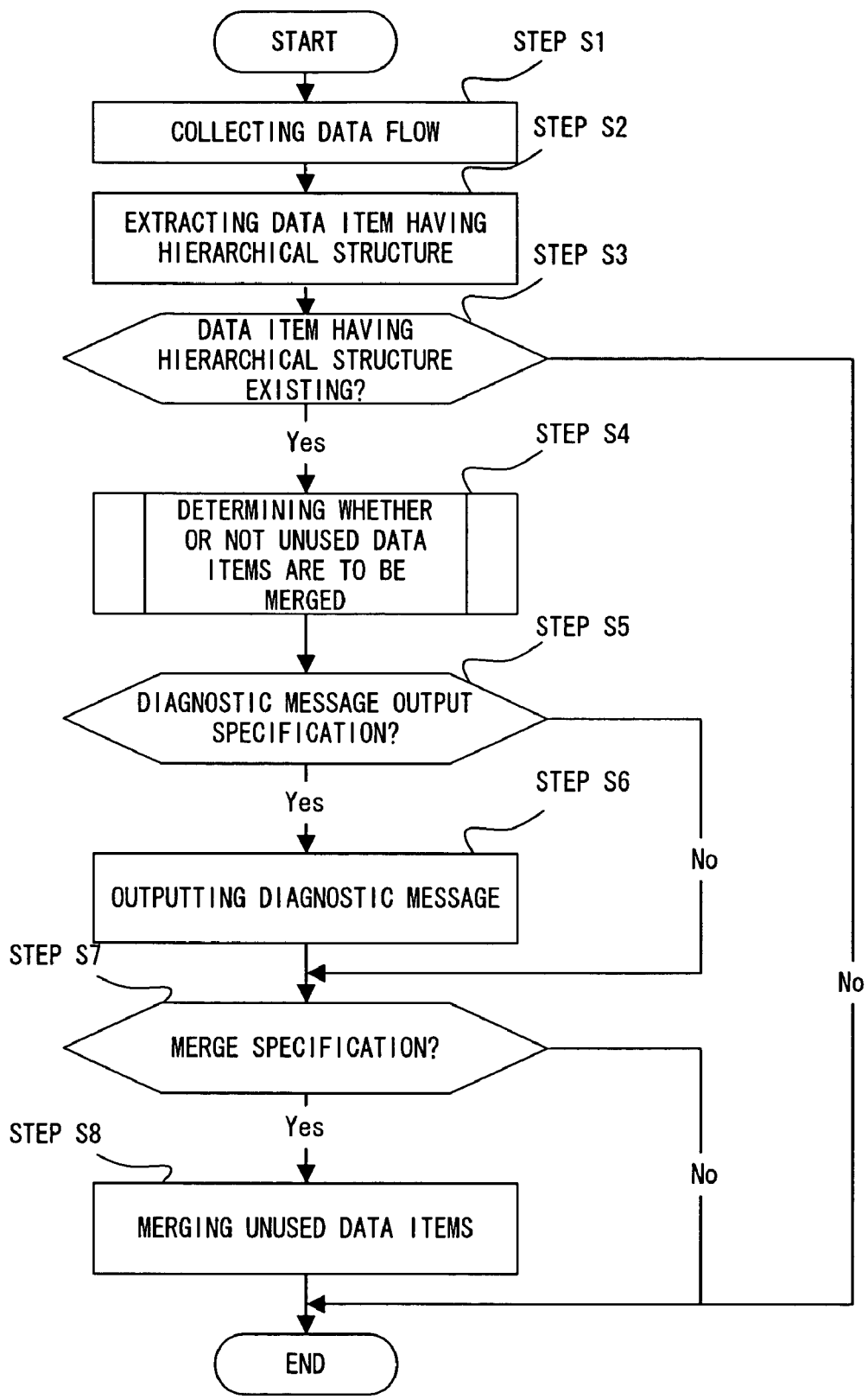
F I G. 6

```
000010 IDENTIFICATION  DIVISION.
000020 PROGRAM-ID.      PRG1.
000030
000040 ENVIRONMENT      DIVISION.
000050 INPUT-OUTPUT     SECTION.
000060 FILE-CONTROL.
000070     SELECT IFILE01 ASSIGN SYSIN
000080 .
000090
000100 DATA             DIVISION.
000110 FILE             SECTION.
000120 FD   IFILE01.
000130 01   IREC01.               *>UNUSED ↑ CONTINUOUS AREA
000140    03   IDATA11  PIC X(20). *>UNUSED |
000150    03   IDATA12  PIC X(20). *>UNUSED |
000160    03   IDATA13  PIC X(20). *>UNUSED |
000170    03   IDATA14  PIC X(20). *>UNUSED ↓
000180 WORKING-STORAGE  SECTION.
000190 01 WREC01.
000200    03   WDATA11  PIC 9(02).
000210    03   WDATA12  PIC 9(02). *>UNUSED ↑ CONTINUOUS AREA
000220    03   WDATA13  PIC 9(02). *>UNUSED ↓
000230    03   WDATA14  PIC 9(02).
000240 01 WREC02.                  *>UNUSED ↑ CONTINUOUS AREA
000250    03   WDATA21  PIC X(40). *>UNUSED |
000260    03   WDATA22  PIC X(40). *>UNUSED ↓
000270 77 WDATA71       PIC 9(02). *>UNUSED
000280 77 WDATA72       PIC 9(02).
000290
000300 PROCEDURE        DIVISION.
000310     MOVE  1 TO WDATA11 OF WREC01.
000320     MOVE  2 TO WDATA14 OF WREC01.
000330     COMPUTE WDATA72 = WDATA11 OF WREC01 + WDATA14 OF WREC01.
000340     DISPLAY WDATA72.
000350     STOP RUN.
```

F I G. 7

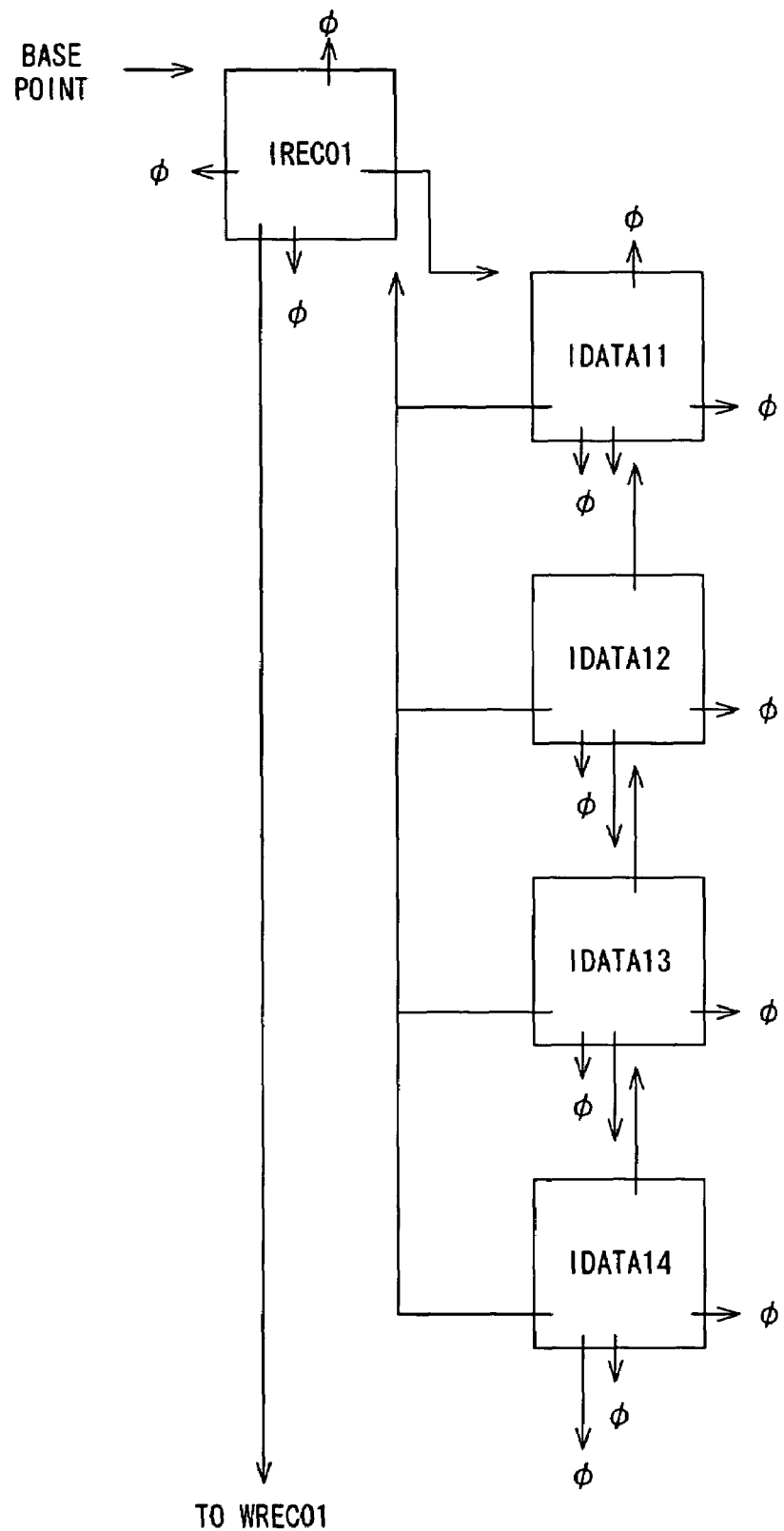
F I G. 8

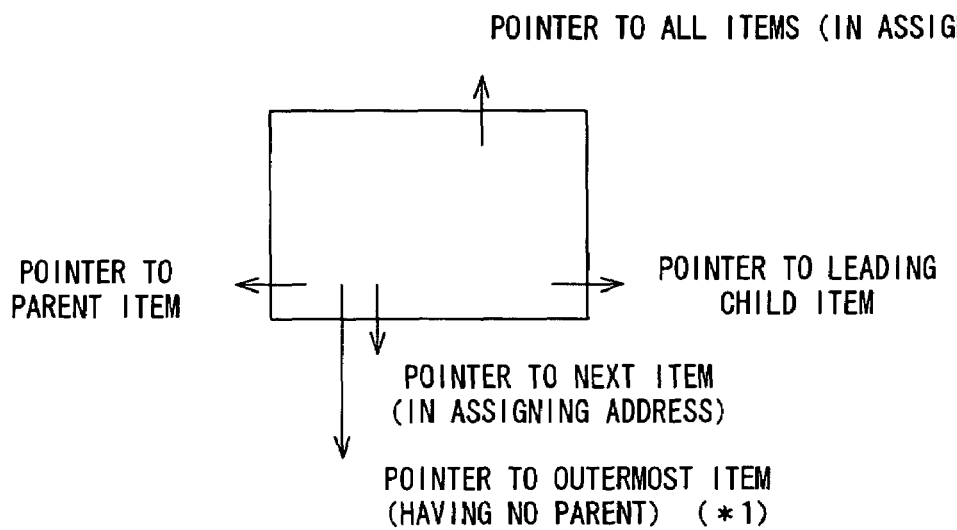
POINTER TO ALL ITEMS (IN ASSIGNING ADDRESS)
POINTER TO PARENT ITEM
POINTER TO LEADING CHILD ITEM
POINTER TO NEXT ITEM (IN ASSIGNING ADDRESS)
POINTER TO OUTERMOST ITEM (HAVING NO PARENT) (*1)
F I G. 1 1 A
IREC01 → IDATA11 → IDATA12 → IDATA13 → IDATA14
WREC01 → WDATA11 → WDATA12 → WDATA13 → WDATA14
WREC02 → WDATA21 → WDATA22
WDATA71
WDATA72 → φ
F I G. 1 1 B

RELATIVE DISPLACEMENT

| | | |
|---|---|---|
| +0 | 01  IREC01 | 02  IDATA11  PIC X(20) |
| +20 | | |
| | | 02  IDATA12  PIC X(20) |
| +40 | | |
| | | 02  IDATA13  PIC X(20) |
| +60 | | |
| | | 02  IDATA14  PIC X(20) |
| +80 | | |

F I G. 1 2

RELATIVE DISPLACEMENT (byte)

| offset | | | |
|---|---|---|---|
| +0 | 01 DATA11 | 02 DATA21 | 03 DATA31 PIC X(5) |
| +5 | | | |
| +6 | | | 03 FILLER PIC X [IDLE BYTE] |
| | | | 03 DATA32 PIC S9(4) BINARY SYNCHRONIZED |
| +8 | | | |
| | | | 03 DATA33 PIC S9(4) BINARY SYNCHRONIZED |
| +10 | | | |
| +11 | | 02 DATA22 | |

↓

RELATIVE DISPLACEMENT (bit)

| offset | | |
|---|---|---|
| +0 | 02 DATA22 | 03 DATA34 PIC 1(4) BIT SYNCHRONIZED |
| +4 | | 03 FILLER PIC 1(4) BIT [IDLE BIT] |
| +8 | | |

F I G. 1 3

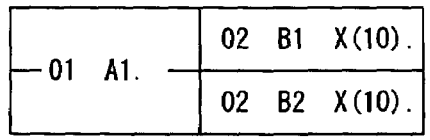
F I G. 1 5 A
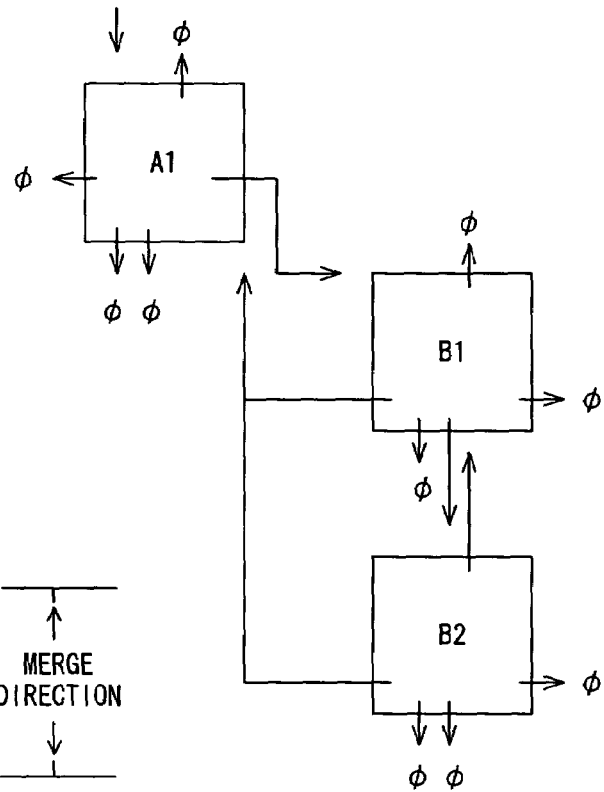
F I G. 1 5 B
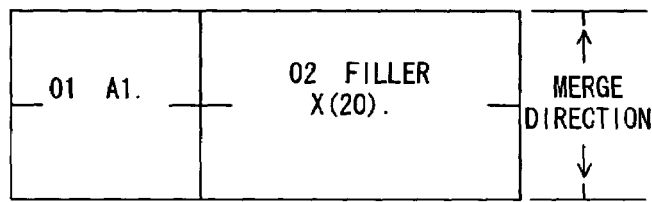
F I G. 1 5 C
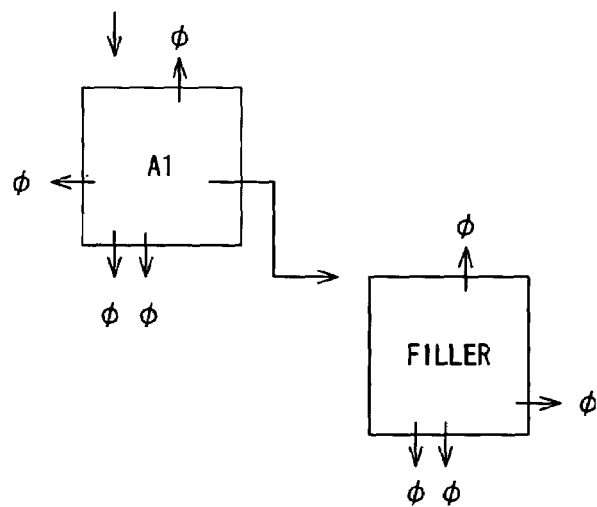
F I G. 1 5 D

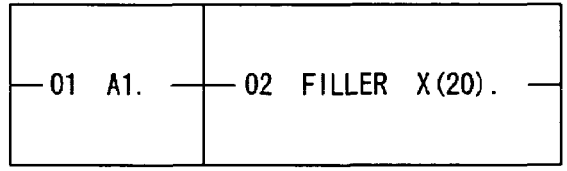
F I G. 1 6 A
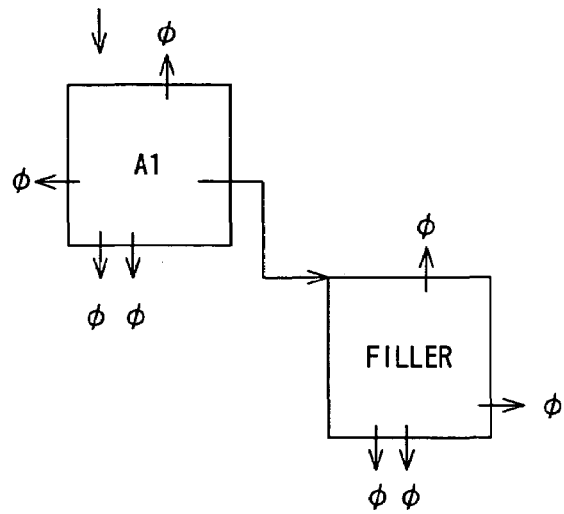
F I G. 1 6 B
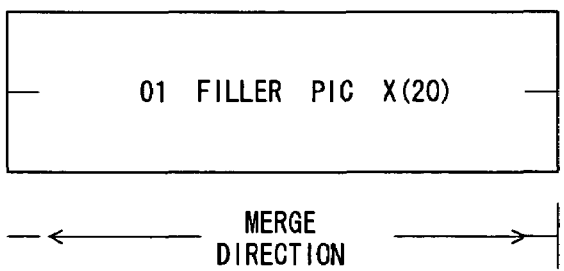
F I G. 1 6 C
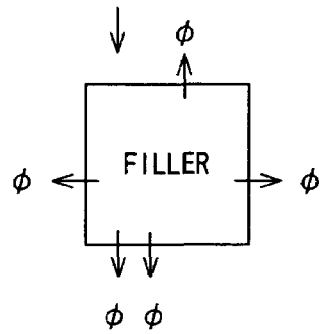
F I G. 1 6 D POINTER TO DATA ITEM DICTIONARY 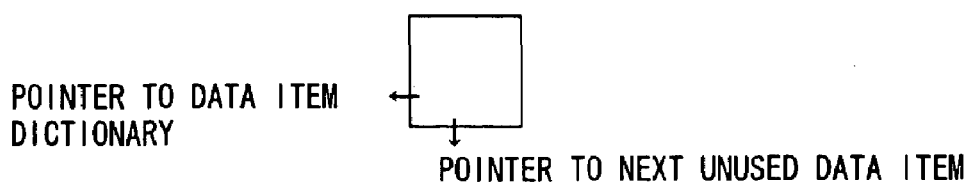
POINTER TO NEXT UNUSED DATA ITEM INFORMATION OTHER THAN POINTER IS DESCRIBED AS FOLLOWS. EXECUTION RESULT OF MERGE DETERMINATION ON DATA ITEM GROUP IS HELD.

- STATUS: { UNDETERMINED | DETERMINED }
  - UNDETERMINED: MERGE DETERMINATION HAS NOT BEEN MADE ON DATA ITEM.
  - DETERMINED:   MERGE DETERMINATION HAS BEEN MADE ON DATA ITEM.

- RESULT: { MERGE-ENABLED | DELETION-ENABLED }
  - MERGE-ENABLED: CAN BE MERGED WITH OTHER DATA ITEMS
                   (CORRESPONDING TO ITEM A)
  - DELETION-ENABLED: CAN BE MERGED WITH OTHER DATA ITEMS
                   (CORRESPONDING TO ITEM B)

- LENGTH:  SIGNIFICANT LENGTH OF MERGED ITEM A WHEN "STATUS" IS
           MERGED-ENABLED.

- TYPE  :  SIGNIFICANT DATA TYPE OF MERGED ITEM A WHEN "STATUS" IS
           MERGE-ENABLED.

F I G. 1 9

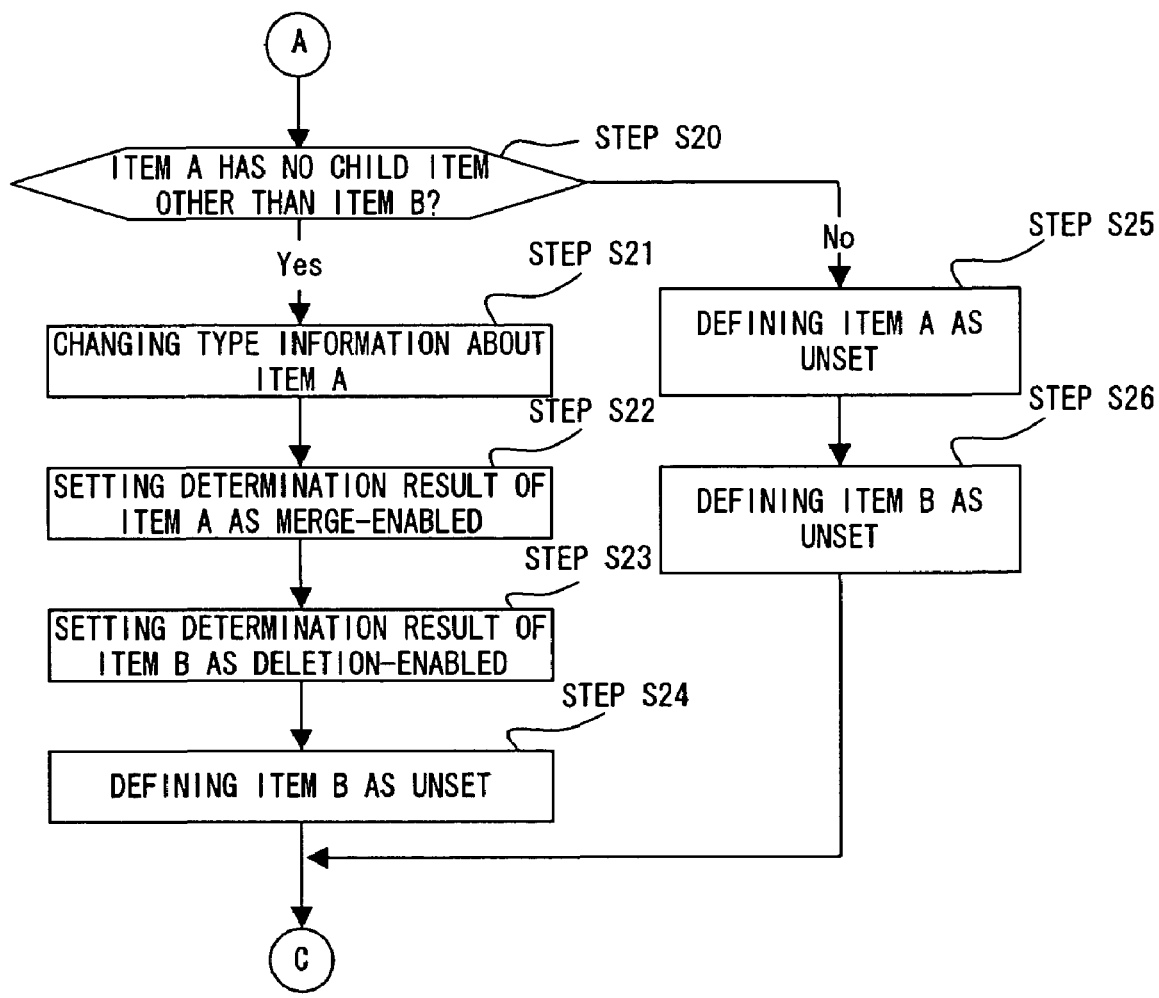
F I G. 2 1

| STAGE | Step | TEMPORARY STORAG AREA | ITEM A | ITEM B | UNDETERMINED DATA ITEM LIST |
|---|---|---|---|---|---|
| 1 | S00(1) | — | — | — | IRECO1 (UNDETERMINED, -), IDATA11 (UNDETERMINED, -), IDATA12 (UNDETERMINED, -), IDATA13 (UNDETERMINED, -), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |
| 2 | S11(0) | — | φ | — | IRECO1 (UNDETERMINED, -) IDATA11 (UNDETERMINED, -), IDATA12 (UNDETERMINED, -), IDATA13 (UNDETERMINED, -), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |
| 3 | S12(0) | — | φ | φ | IRECO1 (UNDETERMINED, -) IDATA11 (UNDETERMINED, -), IDATA12 (UNDETERMINED, -), IDATA13 (UNDETERMINED, -), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |
| 4 | S14(0) | IRECO1 | φ | φ | IRECO1 (DETERMINED, -), IDATA11 (UNDETERMINED, -), IDATA12 (UNDETERMINED, -), IDATA13 (UNDETERMINED, -), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |
| 5 | S16(0) | IRECO1 | IRECO1 | φ | IRECO1 (DETERMINED, -) IDATA11 (UNDETERMINED, -), IDATA12 (UNDETERMINED, -), IDATA13 (UNDETERMINED, -), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |
| 6 | S14(0) | IDATA11 | IRECO1 | φ | IRECO1 (DETERMINED, -), IDATA11 (DETERMINED, -), IDATA12 (UNDETERMINED, -), IDATA13 (UNDETERMINED), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |
| 7 | S17(0) | IDATA11 | IRECO1 | IDATA11 | IRECO1 (DETERMINED, -), IDATA11 (DETERMINED, -), IDATA12 (UNDETERMINED, -), IDATA13 (UNDETERMINED, -), IDATA14 (UNDETERMINED, -), WDATA12 (UNDETERMINED, -), WDATA13 (UNDETERMINED, -), WRECO2 (UNDETERMINED, -), WDATA21 (UNDETERMINED, -), WDATA22 (UNDETERMINED, -) |

F I G. 2 4

| | [RECURSIVE CALL FROM S19] | | | |
|---|---|---|---|---|
| 8 | S00(1) | — | — | — | IDATA11(UNDETERMINED, -), IDATA12(UNDETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |
| 9 | S11(1) | — | $\phi$ | — | IDATA11(UNDETERMINED, -), IDATA12(UNDETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |
| 10 | S12(1) | — | $\phi$ | $\phi$ | IDATA11(UNDETERMINED, -), IDATA12(UNDETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |
| 11 | S14(1) | IDATA11 | $\phi$ | $\phi$ | IDATA11(DETERMINED, -), IDATA12(UNDETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |
| 12 | S16(1) | IDATA11 | IDATA11 | $\phi$ | IDATA11(DETERMINED, -), IDATA12(UNDETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |
| 13 | S14(1) | IDATA12 | IDATA11 | $\phi$ | IDATA11(DETERMINED, -), IDATA12(DETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |
| 14 | S17(1) | IDATA12 | IDATA11 | IDATA12 | IDATA11(DETERMINED, -), IDATA12(DETERMINED, -), IDATA13(UNDETERMINED, -), IDATA14(UNDETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -) |

FIG. 25

| | | | | | |
|---|---|---|---|---|---|
| 15 | S34(1) | IDATA12 | IDATA11 | IDATA12 | IDATA11 (DETERMINED, MERGE-ENABLED), IDATA12 (DETERMINED, -), IDATA13 (UNDETERMINED, -), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |
| 16 | S35(1) | IDATA12 | IDATA11 | IDATA12 | IDATA11 (DETERMINED, MERGE-ENABLED), IDATA12 (DETERMINED, DELETION-ENABLED), IDATA13 (UNDETERMINED, -), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |
| 17 | S36(1) | IDATA12 | IDATA11 | φ | IDATA11 (DETERMINED, MERGE-ENABLED), IDATA12 (DETERMINED, DELETION-ENABLED), IDATA13 (UNDETERMINED, -), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |
| 18 | S14(1) | IDATA13 | IDATA11 | φ | IDATA11 (DETERMINED, MEREGED-ENABLED), IDATA12 (DETERMINED, DELETION-ENABLED), IDATA13 (DETERMINED, -), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |
| 19 | S17(1) | IDATA13 | IDATA11 | IDATA13 | IDATA11 (DETERMINED, MERGED-ENABLED), IDATA12 (DETERMINED, DELETION-ENABLED), IDATA13 (DETERMINED, -), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |
| 20 | S35(1) | IDATA13 | IDATA11 | IDATA13 | IDATA11 (DETERMINED, MERGED-ENABLED), IDATA12 (DETERMINED, DELETION-ENABLED), IDATA13 (DETERMINED, DELETION-ENABLED), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |
| 21 | S36(1) | IDATA13 | IDATA11 | φ | IDATA11 (DETERMINED, MERGED-ENABLED), IDATA12 (DETERMINED, DELETION-ENABLED), IDATA13 (DETERMINED, DELETION-ENABLED), IDATA14 (UNDETERMINED, -), WDATA12 (UNDETERMINED, -), WDATA13 (UNDETERMINED, -), WREC02 (UNDETERMINED, -), WDATA21 (UNDETERMINED, -), WDATA22 (UNDETERMINED, -) |

F I G. 2 6

| | | | | | |
|---|---|---|---|---|---|
| 22 | S14(1) | IDATA14 | IDATA11 | φ | IDATA11(DETERMINED, MERGE-ENABLED), IDATA12(DETERMINED, DELETION-ENABLED), IDATA13(DETERMINED, DELETION-ENABLED), IDATA14(DETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -), |
| 23 | S17(1) | IDATA14 | IDATA11 | IDATA14 | IDATA11(DETERMINED, MERGE-ENABLED), IDATA12(DETERMINED, DELETION-ENABLED), IDATA13(DETERMINED, DELETION-ENABLED), IDATA14(DETERMINED, -), WDATA12(UNDETERMINED, -), WDATA13(UNDETERMINED, -), WRECO2(UNDETERMINED, -), WDATA21(UNDETERMINED, -), WDATA22(UNDETERMINED, -), |
| 24 | S35(1) | IDATA14 | IDATA11 | IDATA14 | IDATA11(DETERMINED, MERGE-ENABLED), IDATA12(DETERMINED, DELETION-ENABLED), IDATA13(DETERMINED, DELETION-ENABLED), IDATA14(DETERMINED, DELETION-ENABLED), WDATA12(UNDETERMINED, -), WDATA13(UNDETERMINED, -), WRECO2(UNDETERMINED, -), WDATA21(UNDETERMINED, -), WDATA22(UNDETERMINED, -), |
| 25 | S36(1) | IDATA14 | IDATA11 | φ | IDATA11(DETERMINED, MEREGE-ENABLED), IDATA12(DETERMINED, DELETION-ENABLED), IDATA13(DETERMINED, DELETION-ENABLED), IDATA14(DETERMINED, DELETION-ENABLED), WDATA12(UNDETERMINED, -), WDATA13(UNDETERMINED, -), WRECO2(UNDETERMINED, -), WDATA21(UNDETERMINED, -), WDATA22(UNDETERMINED, -), |
| 26 | S14(1) | WDATA12 | IDATA11 | φ | IDATA11(DETERMINED, MERGE-ENABLED), IDATA12(DETERMINED, DELETION-ENABLED), IDATA13(DETERMINED, DELETION-ENABLED), IDATA14(DETERMINED, DELETION-ENABLED), WDATA12(UNDETERMINED, -), WDATA13(UNDETERMINED, -), WRECO2(UNDETERMINED, -), WDATA21(UNDETERMINED, -), WDATA22(UNDETERMINED, -), |
| 27 | S17(1) | WDATA12 | IDATA11 | WDATA12 | IDATA11(DETERMINED, MERGE-ENABLED), IDATA12(DETERMINED, DELETION-ENABLED), IDATA13(DETERMINED, DELETION-ENABLED), IDATA14(DETERMINED, DELETION-ENABLED), WDATA12(DETERMINED, -), WDATA13(UNDETERMINED, -), WRECO2(UNDETERMINED, -), WDATA21(UNDETERMINED, -), WDATA22(UNDETERMINED, -), |
| [RECOVERY FROM RECURSIVE CALL] | | | | | |
| 28 | S19(0) | IDATA11 | IRECO1 | IDATA11 | IRECO1(DETERMINED, -), IDATA11(DETERMINED, MERGE-ENABLED), IDATA12(DETERMINED, DELETION-ENABLED), IDATA13(DETERMINED, DELETION-ENABLED), IDATA14(DETERMINED, DELETION-ENABLED), WDATA12(UNDETERMINED, -), WDATA13(UNDETERMINED, -), WRECO2(UNDETERMINED, -), WDATA21(UNDETERMINED, -), WDATA22(UNDETERMINED, -), |

F I G. 2 7

| | | | | | |
|---|---|---|---|---|---|
| 29 | S22(0) | IDATA11 | IREC01 | IDATA11 | IREC01 (DETERMINED, MERGE-ENABLED), IDATA11 (DETERMINED, MERGE-ENABLED), IDATA12 (DETERMINED, DELETION-ENABLED), IDATA13 (DETERMINED, DELETION-ENABLED), IDATA14 (DETERMINED, DELETION-ENABLED), WDATA12 (UNDETERMINED, -), WDATA13 (UNDETERMINED, -), WREC02 (UNDETERMINED, -), WDATA21 (UNDETERMINED, -), WDATA22 (UNDETERMINED, -), |
| 30 | S23(0) | IDATA11 | IREC01 | IDATA11 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (UNDETERMINED, -), WDATA13 (UNDETERMINED, -), WREC02 (UNDETERMINED, -), WDATA21 (UNDETERMINED, -), WDATA22 (UNDETERMINED, -), |
| 31 | S24(0) | IDATA11 | IREC01 | φ | IREC01 (DETERMINED, MERGE-ENABLED) IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (UNDETERMINED, -), WDATA13 (UNDETERMINED, -), WREC02 (UNDETERMINED, -), WDATA21 (UNDETERMINED, -), WDATA22 (UNDETERMINED, -), |
| 32 | S14(1) | WDATA12 | IREC01 | φ | IREC01 (DETERMINED, MEREGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, -), WDATA13 (UNDETERMINED, -), WREC02 (UNDETERMINED, -), WDATA21 (UNDETERMINED, -), WDATA22 (UNDETERMINED, -) |
| 33 | S17(0) | WDATA12 | IREC01 | WDATA12 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, -), WDATA13 (UNDETERMINED, -), WREC02 (UNDETERMINED, -), WDATA21 (UNDETERMINED, -), WDATA22 (UNDETERMINED, -), |
| 34 | S39(0) | WDATA12 | WDATA12 | WDATA12 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, -), WDATA13 (UNDETERMINED, -), WREC02 (UNDETERMINED, -), WDATA21 (UNDETERMINED, -), WDATA22 (UNDETERMINED, -), |
| 35 | S40(0) | WDATA12 | WDATA12 | φ | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, -), WDATA13 (UNDETERMINED, -), WREC02 (UNDETERMINED, -), WDATA21 (UNDETERMINED, -), WDATA22 (UNDETERMINED, -), |

FIG. 28

| | | | | | |
|---|---|---|---|---|---|
| 36 | S14(0) | WDATA13 | WDATA12 | φ | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, -), WDATA13 (DETERMINED, -), WREC02 (UNDETERMINED, -), WDATA21 (UNDETERMINED, -), WDATA22 (UNDETERMINED, -) |
| 37 | S17(0) | WDATA13 | WDATA12 | WDATA13 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, -), WDATA13 (DETERMINED, -), WREC02 (UNDETERMINED, -), WDATA21 (UNDETERMINED, -), WDATA22 (UNDETERMINED, -) |
| 38 | S34(0) | WDATA13 | WDATA12 | WDATA13 | IREC01 (DETERMINED, MERGE-ENABLED) IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, -), WREC02 (UNDETERMINED, -), WDATA21 (UNDETERMINED, -), WDATA22 (UNDETERMINED, -) |
| 39 | S35(0) | WDATA13 | WDATA12 | WDATA13 | IREC01 (DETERMINED, MEREGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (UNDETERMINED, -), WDATA21 (UNDETERMINED, -), WDATA22 (UNDETERMINED, -) |
| 40 | S36(0) | WDATA13 | WDATA12 | φ | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (UNDETERMINED, -), WDATA21 (UNDETERMINED, -), WDATA22 (UNDETERMINED, -) |
| 41 | S14(0) | WREC02 | WDATA12 | φ | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (DETERMINED, -), WDATA21 (UNDETERMINED, -), WDATA22 (UNDETERMINED, -) |
| 42 | S17(0) | WREC02 | WDATA12 | WREC02 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (DETERMINED, -), WDATA21 (UNDETERMINED, -), WDATA22 (UNDETERMINED, -) |

FIG. 29

| | | | | |
|---|---|---|---|---|
| 43 | S39(0) | WREC02 | WREC02 | WREC02 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (DETERMINED, -), WDATA21 (UNDETERMINED, -), WDATA22 (UNDETERMINED, -) |
| 44 | S40(0) | WREC02 | WREC02 | φ | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (DETERMINED, -), WDATA21 (UNDETERMINED, -), WDATA22 (UNDETERMINED, -) |
| 45 | S14(0) | WDATA21 | WREC02 | φ | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (DETERMINED, -), WDATA21 (DETERMINED, -), WDATA22 (UNDETERMINED, -) |
| 46 | S17(0) | WDATA21 | WREC02 | WDATA21 | IREC01 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WREC02 (DETERMINED, -), WDATA21 (DETERMINED, -), WDATA22 (UNDETERMINED, -) |
| | [RECURSIVE CALL FROM S19] | | | | |
| 47 | S00(1) | - | - | - | WDATA21 (UNDETERMINED, -), WDATA22 (UNDETERMINED, -), |
| 48 | S11(1) | - | φ | - | WDATA21 (UNDETERMINED, -), WDATA22 (UNDETERMINED, -), |
| 49 | S12(1) | - | φ | φ | WDATA21 (UNDETERMINED, -), WDATA22 (UNDETERMINED, -), |
| 50 | S14(1) | WDATA21 | φ | φ | WDATA21 (DETERMINED, -), WDATA22 (UNDETERMINED, -), |
| 51 | S16(1) | WDATA21 | WDATA21 | φ | WDATA21 (DETERMINED, -), WDATA22 (UNDETERMINED, -), |
| 52 | S14(1) | WDATA22 | WDATA21 | φ | WDATA21 (DETERMINED, -), WDATA22 (DETERMINED, -), |
| 53 | S34(1) | WDATA22 | WDATA21 | WDATA22 | WDATA21 (DETERMINED, MERGE-ENABLED), WDATA22 (DETERMINED, -), |
| 54 | S35(1) | WDATA22 | WDATA21 | WDATA22 | WDATA21 (DETERMINED, MERGE-ENABLED), WDATA22 (DETERMINED, DELETION-ENABLED), |

F I G. 3 0

| | | | | | |
|---|---|---|---|---|---|
| 55 | S36(1) | WDATA22 | WDATA21 | φ | WDATA21 (DETERMINED, MERGE-ENABLED), WDATA22 (DETERMINED, DELETION-ENABLED), |
| [RECOVERY FROM RECURSIVE CALL] | | | | | |
| 56 | S19(0) | WDATA21 | WRECO2 | WDATA21 | IRECO1 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WRECO2 (DETERMINED, -), WDATA21 (DETERMINED, MERGE-ENABLED), WDATA22 (DETERMINED, DELETION-ENABLED) |
| 57 | S22(0) | WDATA21 | WRECO2 | WDATA21 | IRECO1 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WRECO2 (DETERMINED, MERGE-ENABLED), WDATA21 (DETERMINED, MERGE-ENABLED), WDATA22 (DETERMINED, DELETION-ENABLED) |
| 58 | S23(0) | WDATA21 | WRECO2 | WDATA21 | IRECO1 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WRECO2 (DETERMINED, MERGE-ENABLED), WDATA21 (DETERMINED, DELETION-ENABLED), WDATA22 (DETERMINED, DELETION-ENABLED) |
| 59 | S24(0) | WDATA21 | WRECO2 | φ | IRECO1 (DETERMINED, MERGE-ENABLED), IDATA11 (DETERMINED, DELETION-ENABLED), IDATA12 (DETERMINED, DELETION-ENABLED), IDATA13 (DETERMINED, DELETION-ENABLED), IDATA14 (DETERMINED, DELETION-ENABLED), WDATA12 (DETERMINED, MERGE-ENABLED), WDATA13 (DETERMINED, DELETION-ENABLED), WRECO2 (DETERMINED, MERGE-ENABLED), WDATA21 (DETERMINED, DELETION-ENABLED), WDATA22 (DETERMINED, DELETION-ENABLED) |

F I G. 3 1

```
000010 IDENTIFICATION   DIVISION.
000020 PROGRAM-ID.      PRG1.
000030
000040 ENVIRONMENT      DIVISION.
000050 INPUT-OUTPUT     SECTION.
000060 FILE-CONTROL.
000070     SELECT IFILE01 ASSIGN SYSIN
000080 .
000090
000100 DATA             DIVISION.
000110 FILE             SECTION.
000120 FD   IFILE01.
000130 01   FILLER      PIC X(80).  *>UNUSED, VARIABLE AFTER MERGE
000140* MERGE ↑
000150* MERGE ↑
000160* MERGE ↑
000170* MERGE ↑
000180 WORKING-STORAGE  SECTION.
000190 01 WRECO1.
000200    03  WDATA11   PIC 9(02).
000210    03  FILLER    PIC 9(04).  *>UNUSED, VARIABLE AFTER MERGE
000220* MERGE ↑
000230    03  WDATA14   PIC 9(02).
000240 01 FILLER        PIC X(80).  *>UNUSED, VARIABLE AFTER MERGE
000250* MERGE ↑
000260* MERGE ↑
000270 77 WDATA71       PIC 9(02).  *>UNUSED
000280 77 WDATA72       PIC 9(02).
000290
000300 PROCEDURE        DIVISION.
000310     MOVE  1 TO WDATA11 OF WRECO1.
000320     MOVE  2 TO WDATA14 OF WRECO1.
000330     COMPUTE WDATA72 = WDATA11 OF WRECO1 + WDATA14 OF WRECO1.
000340     DISPLAY  WDATA72.
000350     STOP RUN.
```

FIG. 32

```
000010 IDENTIFICATION   DIVISION.
000020 PROGRAM-ID.      PRG1.
000030
000040 ENVIRONMENT      DIVISION.
000050 INPUT-OUTPUT     SECTION.
000060 FILE-CONTROL.
000070      SELECT IFILE01 ASSIGN SYSIN
000080 .
000090
000100 DATA             DIVISION.
000110 FILE             SECTION.
000120 FD   IFILE01.
000130 01   FILLER    PIC X(80).  *>UNUSED, VARIABLE AFTER MERGE
000140* MERGE ↑
000150* MERGE ↑
000160* MERGE ↑
000170* MERGE ↑
000180 WORKING-STORAGE  SECTION.
000190 01 WREC01.
000200    03  WDATA11  PIC 9(02).
000210    03  FILLER   PIC 9(04).  *>UNUSED, VARIABLE AFTER MERGE
000220* MERGE ↑
000230    03  WDATA14  PIC 9(02).
000240* DELETION
000250* MERGE ↑
000260* MERGE ↑
000270* DELETION
000280 77 WDATA72      PIC 9(02).
000290
000300 PROCEDURE        DIVISION.
000310      MOVE  1 TO WDATA11 OF WREC01.
000320      MOVE  2 TO WDATA14 OF WREC01.
000330      COMPUTE WDATA72 = WDATA11 OF WREC01 + WDATA14 OF WREC01.
000340      DISPLAY WDATA72.
000350      STOP RUN.
```

F I G. 3 3

```
include <stdio.h> struct {
   char   idata11[20];    /*UNUSED*/    ↑
   char   idata12[20];    /*UNUSED*/    |  CONITNUOUSE
   char   idata13[20];    /*UNUSED*/    |    AREA
   char   idata14[20];    /*UNUSED*/    |
} irec01;                 /*UNUSED*/    ↓ void main(void) {
   struct {
      short wdata11;
      short wdata12;      /*UNUSED*/    ↑ CONITNUOUSE
      short wdata13;      /*UNUSED*/    ↓   AREA
      short wdata14;
   } wrec01;

struct {
      char   wdata21[40]; /*UNUSED*/    ↑ CONITNUOUSE
      char   wdata22[40]; /*UNUSED*/    |   AREA
   } wrec02;              /*UNUSED*/    ↓ short wdata71;         /*UNUSED*/
   short wdata72;

wrec01.wdata11 = 1;
   wrec01.wdata14 = 2;
   wdata72 = wrec01.wdata11 + wrec01.wdata14;
   printf("%d\n", wdata72);
}
```

FIG. 34

```
include<stdio.h> char irec01[80];   /*UNUSED. VARIABLE AFTER MERGE*/ void main(void) {
 struct{
   short wdata11;
   char wdata12[4];   /*UNUSED. VARIABLE AFTER MERGE*/
   short wdata14;
 }wrec01;

char wrec02[80];    /*UNUSED. VARIABLE AFTER MERGE*/ short wdata71;      /*UNUSED*/
 short wdata72;

wrec01.wdata11 = 1;
 wrec01.wdata14 = 2;
 wdata72=wrec01.wdata11 + wrec01.wdata14;
 printf("%d\n",wdata72);
 }
```

FIG. 35

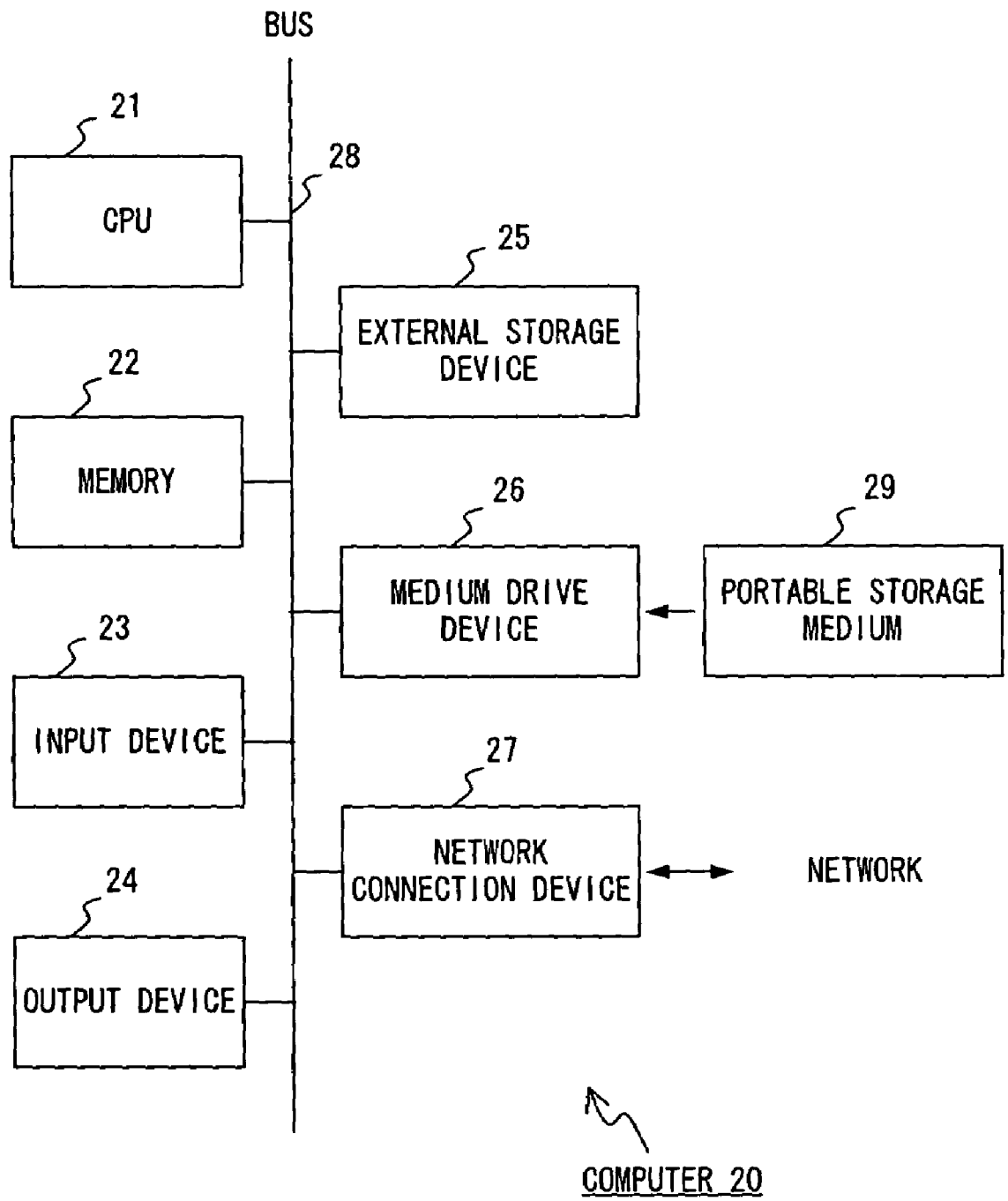
F I G. 3 6

PROGRAM OPTIMIZATION BY UNUSED DATA ITEM

BACKGROUND OF THE INVENTION

1. Field of the Invention

The present invention relates to the technology of optimizing a program, and more specifically to the technology of merging and deleting an unused data item in the program.

2. Description of the Related Art

Data items such as a variable, etc. are defined in a program in many cases. However, not all defined data items are not used in the program. In the following explanation, a data item defined but used in a program is referred to as an unused data item. Although a data item dictionary is generated during compilation, program analysis, etc., a larger memory requirement is required when unused data items are contained in the data item dictionary. Since an unused data item is not used in a program, a code for definition of the data item is not required. Therefore, a compiler is provided with the function of deleting a code for definition of an unused data item in many cases so that memory sources can be effectively used.

The function of deleting a code for definition of an unused data item is described below by referring to a compiler. In addition to the above mentioned function, an actual compiler has the functions of removing a simple assignment, optimizing a constant calculation, etc. However, for simple explanation, it is assumed that a compiler does not perform optimization other than deletion of a code for definition of an unused data item.

FIG. 1 shows an example of a source program described in COBOL (COmmon Business Oriented Language). In the source program, since the variables IREC01, IDATA11, IDATA12, IDATA13, and IDATA14 defined in lines 130 through 170 are not referred to in the procedure division in and after line 300, they are unused data items. Similarly, the variables WDATA12, WDATA13, WREC02, WDATA21, WDATA22, and WDATA71 defined in lines 210, 220, and 240 through 270 are also unused data items.

When a code for definition of an unused data item is removed by the conventional technology from the source program shown in FIG. 1, the source program shown in FIG. 2 can be obtained. In FIG. 2, the codes in lines 240 through 270 are removed.

FIG. 3 shows an example of a source program described in C. The source program shown in FIG. 3 has almost the same contents as the source program described in COBOL shown in FIG. 1. FIG. 4 shows a result of removing a record for definition of an unused data item from the source program shown in FIG. 3 by the conventional technology.

According to the compiler disclosed in the Japanese Patent Application Laid-open No. Hei 7-239788, it is determined whether or not a variable for which a data type is declared in the program has been used in the process description. If no use is determined, an error message is output to an output device, thereby notifying the user of the wasteful type declarlation in the program, and suppressing the generation of a variable for which a wasteful type declarlation is made. The compiler prevents a wasteful type declarlation from being included in a compiled program.

However, according to the above-mentioned conventional technology, the following unused data item cannot be removed to prevent the address from being shifted in the memory allotted to each data item.

data item forming at least a part of a record (a record is a data item having a hierarchical structure.)

Using the source program described in COBOL shown in FIGS. 1 and 2, the above-mentioned problems are practically described below. IREC01, IDATA11, IDATA12, IDATA13, IDATA14, WDATA12, and WDATA13 defined in the source program shown in FIG. 1 in lines 130 through 170, 210, and 220 are unused data items, but these unused data items are not removed in the source program shown in FIG. 2. Relating to the unused data item IREC01, IFILE01 is used in the SELECT statement in line 70. The unused data items IDATA11, IDATA12, IDATA13, and IDATA14 are data items configuring the IREC01. The unused data items WDATA12 and WDATA13 are data items configuring the record WREC01.

From the source program described in C shown in FIGS. 3 and 4, similar unused data items cannot be removed not only in COBOL but also in other languages.

However, the size of the memory area in a computer is limited. If unused data items in a source program which cannot be deleted are processed as is, then the process may not continue because the available memory area possibly becomes insufficient during compilation, generation of a data item dictionary, etc.

To reduce the memory requirement when a source program is compiled and a data item dictionary is generated for the source program, it is desired that the smallest possible number of unused data items are contained in the source program.

SUMMARY OF THE INVENTION

The present invention has been developed to solve the above mentioned problems, and aims at more effectively deleting the number of unused data items than the conventional technology, thereby optimizing a program to reduce the memory requirement during compilation and generation of a data item dictionary.

According to the first aspect of the present invention, the optimizing apparatus for optimizing a program includes: a data item extraction unit extracting data items from the program; a layout unit laying out the extracted data items on memory; an unused data item extraction unit extracting defined but unused data items from the data items; a merge determination unit determining whether or not it is possible to merge a plurality of unused data items forming at least a part of a data item having a hierarchical structure into a new data item based in the layout; and a data item merge unit outputting the program in which the plurality of unused data items are merged into the new data item based on the determination result.

Conventionally, unused data items forming at least a part of a data item having a hierarchical structure cannot be deleted. However, the number of unused data items can be more effectively reduced than the conventional technology by merging a plurality of unused data items based on the layout on the memory with the above mentioned configuration. Therefore, a program can be optimized by reducing the memory requirement during compilation and generation of a data item dictionary.

The above mentioned unused data items to be merged can be laid out on adjacent areas on the memory.

When it is determined that data items can be merged, there are two merging methods. First, when the plurality of unused data items form another data item having a hierarchical structure, and have the same hierarchical levels in the hierarchical structure, the merge determination unit determines that these data items can be merged. If a plurality of unused data items are a data item forming another data item having a hierarchical structure and a data item being the other data item, and the other data item having the hierarchical structure is formed by only one data item, then the merge determination unit determines that the plurality of unused data items can be merged.

Furthermore, the data item merge unit can delete a code for declaration of unused data item from the program, and add a code for declaration of a new data item. A program can be optimized by deleting an unnecessary definition code from the program.

Additionally, the data item merge unit can calculate a sum of the item lengths of the plurality of unused data items to be merged, and set the item length of a new data item based on the sum. Thus, the address of the data item on the memory before the merge can be prevented from being changed after the merge.

In merging the data items, the data type of a new data item to be declared can be set in a plurality of methods. First, when the data types of the plurality of unused data items are all the same, the data item merge unit can set the data type of the new data item as the same data type as the plurality of unused data items to be merged. Thus, the data type of the data item before the merge can be prevented from being changed after the merge.

Furthermore, the data item merge unit can set the data type of the new data item as a data type of the smallest storage area. The data type of the smallest storage area size can be set as the data type of the new item, thereby easily setting the data type. An example of the case in which it is difficult to set a data type can be, for example, a case in which the data types of the plurality of unused data items to be merged are different. There is another case in which, to make the item length of a new data item equal to the sum of the item lengths of a plurality of unused data items before the merge, it is necessary to set a data type for a new data item different from the data type of the data item before the merge. For a practical example of the latter case, there is a case in which unused data items declared as numeric data for which the precision of single-precision integer data, etc. is specified are to be merged.

In merging data items as described above, there are a plurality of methods of setting the item name of a new data item to be declared. For example, the data item merge unit can set the item name of the new data item as a blank. The data item merge unit can also set the item name of the new data item based on one of the unused data items to be merged. Additionally, the data item merge unit can set the item name of the new data item based on the specification of the user of the optimizing apparatus.

According to another aspect of the present invention, the method of optimizing a program, comprising: extracting a data item from the program; laying out the data item on the memory provided for the computer; extracting a defined but unused data item from the extracted data item; determining whether or not a plurality of unused data items forming at least a part of the data items having hierarchical structures in the unused data items can be merged into a new data item based on the layout result; and outputting the program in which the plurality of data items are merged into the new data item based on the above mentioned determination result. Since the program optimizing method can also obtain the operation and effect of the above mentioned optimizing apparatus, the above mentioned problems can be successfully solved.

Furthermore, the computer program used to direct a computer to execute the procedure in the block diagram program optimizing method can also solve the above mentioned problems by temporarily storing the computer program in the memory provided in the computer, and allowing the computer to read the computer program from the memory for execution.

Additionally, the above mentioned problems can be solved by allowing a computer to read the computer program from a computer-readable storage medium storing the computer program, loading the program, and then executing the program as described above.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 shows an example of a source program described in COBOL;

FIG. 2 shows a result of deleting codes for definition of unused data items from the source program shown in FIG. 1 by the conventional technology;

FIG. 3 shows an example of a source program described in C;

FIG. 4 shows a result of deleting codes for definition of unused data items from the source program shown in FIG. 3 by the conventional technology;

FIG. 6 is a flowchart of the outline of the flow of the optimizing process;

FIG. 7 shows an example of a source program described in COBOL;

FIG. 8 is a view (1) of a data item dictionary of the source program shown in FIG. 7;

FIGS. 11A and 11B show notation methods of a data item dictionary;

FIG. 12 is a view (1) of an example of the layout of a data item;

FIG. 13 is a view (2) of an example of the layout of a data item;

FIG. 15A shows an example of a layout of a data item;

FIG. 15B shows an example of a data item dictionary for FIG. 15A;

FIG. 15C shows an example of a layout after a back-and-forth direction merge;

FIG. 15D shows an example of a data item dictionary for the layout shown in FIG. 15C;

FIG. 16A shows an example of a layout of a data item;

FIG. 16B shows an example of a data item dictionary for FIG. 16A;

FIG. 16C shows an example of a layout after a set direction merge;

FIG. 16D shows an example of a data item dictionary for the layout shown in FIG. 16C;

FIG. 19 is a view for explanation of the notation method included in the undetermined data item list and the information included in the undetermined data item list shown in FIGS. 17 and 18;

FIG. 21 is a flowchart (2) of the procedure of determining a merge;

FIG. 24 is a view (1) of the setting contents of the items A and B in each step of determining a merge on the source program shown in FIG. 7, and the contents of the undetermined data item list;

FIG. 25 is a view (2) of the setting contents of the items A and B in each step of determining a merge on the source program shown in FIG. 7, and the contents of the undetermined data item list;

FIG. 26 is a view (3) of the setting contents of the items A and B in each step of determining a merge on the source program shown in FIG. 7, and the contents of the undetermined data item list;

FIG. 27 is a view (4) of the setting contents of the items A and B in each step of determining a merge on the source program shown in FIG. 7, and the contents of the undetermined data item list;

FIG. 28 is a view (5) of the setting contents of the items A and B in each step of determining a merge on the source program shown in FIG. 7, and the contents of the undetermined data item list;

FIG. 29 is a view (6) of the setting contents of the items A and B in each step of determining a merge on the source program shown in FIG. 7, and the contents of the undetermined data item list;

FIG. 30 is a view (7) of the setting contents of the items A and B in each step of determining a merge on the source program shown in FIG. 7, and the contents of the undetermined data item list;

FIG. 31 is a view (8) of the setting contents of the items A and B in each step of determining a merge on the source program shown in FIG. 7, and the contents of the undetermined data item list;

FIG. 32 shows a result of optimizing the source program shown in FIG. 7;

FIG. 33 shows a result of deleting unnecessary definition codes from the optimized source program shown in FIG. 32;

FIG. 34 shows an example of the source program described in C;

FIG. 35 shows a result of optimizing the source program shown in FIG. 34;

FIG. 36 shows the configuration of a computer; and

DESCRIPTION OF THE PREFERRED EMBODIMENTS

Figure 5:
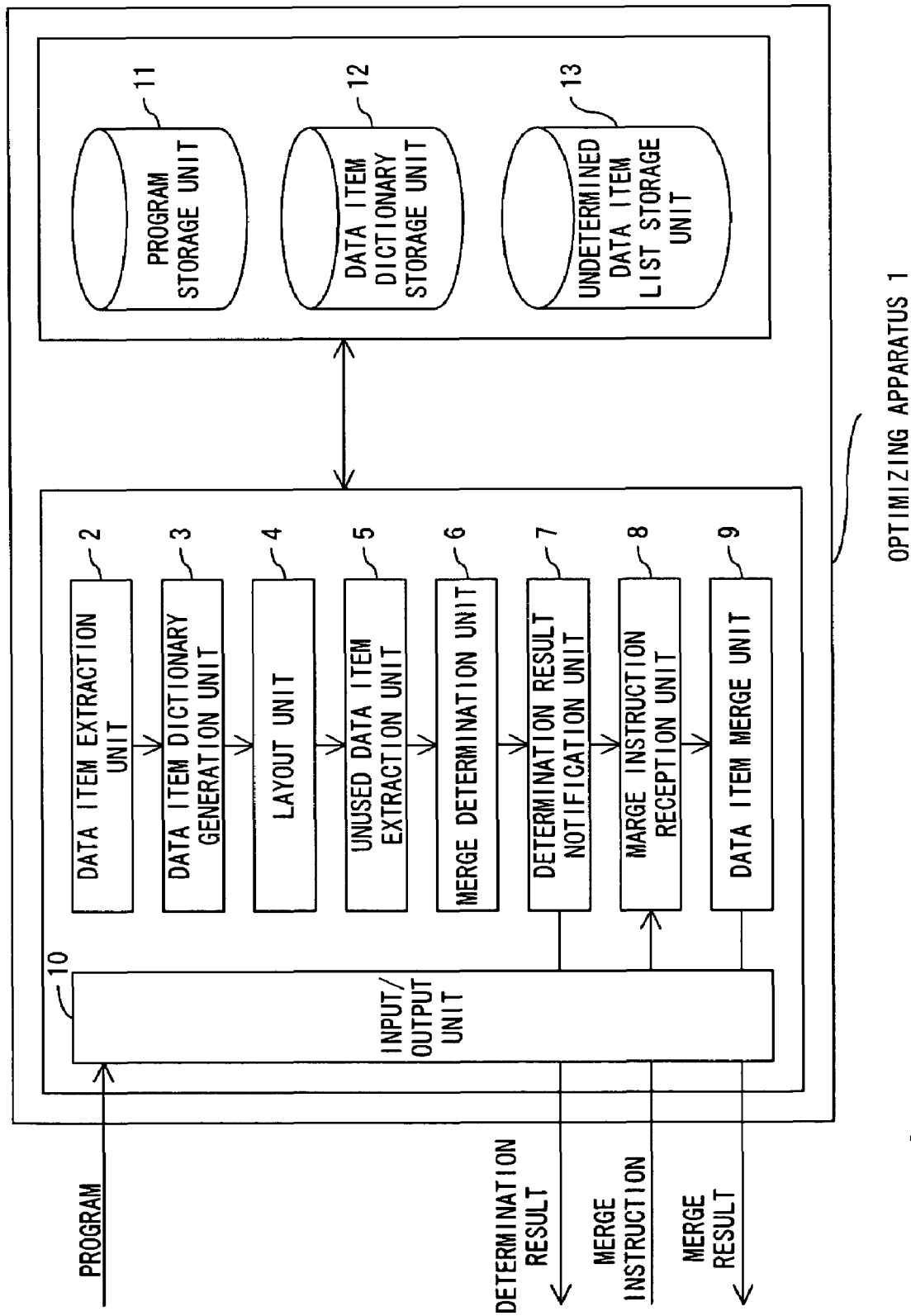
FIG. 5 shows the configuration of the optimizing apparatus.

The embodiments of the present invention are described below by referring to the attached drawings. The same devices, etc. are assigned the same reference numerals, and double explanation is omitted.

FIG. 5 shows the configuration of an optimizing apparatus 1 according to the present invention. The optimizing apparatus 1 optimizes a source program such that the number of data items contained in the source program can be reduced by merging unused data items. As shown in FIG. 5, the optimizing apparatus 1 comprises a data item extraction unit 2, a data item dictionary generation unit 3, a layout generation unit 4, an unused data item extraction unit 5, a merge determination unit 6, a determination result notification unit 7, a merge instruction reception unit 8, a data item merge unit 9, an input/output unit 10, a program storage unit 11, a data item dictionary storage unit 12, and an undetermined data item list storage unit 13.

The data item extraction unit 2 obtains a source program from the program storage unit 11, and extracts data items from the source program. The data item dictionary generation unit 3 generates a data item dictionary indicating the contents of the extracted data items and the relationship between data items, and writes it to the data item dictionary storage unit 12. The layout unit 4 arranges (lays out)the extracted data item in the memory (not shown in FIG. 5). The unused data item extraction unit 5 extracts unused data items in the extracted data items. The merge determination unit 6 determines based on the layout in the memory whether or not a group of a plurality of unused data items in the extracted unused data items can be merged into a data item. The determination result notification unit 7 notifies the user of the optimizing apparatus 1 of the plurality of unused data items determined that they can be merged by the merge determination unit 6 through the input/output unit 10. The merge instruction reception unit 8 receives an instruction as to whether or not data items are to be merged through the input/output unit 10. The data item merge unit 9 merges data items according to an instruction from a user, and notifies the user of the merge result through the input/output unit 10. The input/output unit 10 is used in communicating information between a user and the optimizing apparatus 1.

The program storage unit 11 stores the source program input through the input/output unit 10, and the optimized source program. The data item dictionary storage unit 12 stores a data item dictionary generated by the data item dictionary generation unit 3. The undetermined data item list storage unit 13 stores an undetermined data item list. The undetermined data item list is generated by the merge determination unit 6 based on the extraction result and the layout result of unused data items, and is used to manage data items to be determined and determination results when it is determined whether or not data item can be merged.

Then, by referring to FIGS. 6 through 27, the processes performed by the optimizing apparatus 1 are described below. First, the outline of the flow of the optimizing process of a program is described below by referring to FIG. 6.

As shown in FIG. 6, the optimizing apparatus 1 first retrieves the source program to be optimized from the program storage unit 11, analyzes the data flow in the source program, and collects the definitions of data items and reference information (S1). The analysis of a data flow is a common optimizing method of a program in a compiler, etc. The procedure of analyzing a data flow is described below.

1) The data item extraction unit 2 collects declaration information about data items for the translation text after the execution of a preprocess. An example of translation text can be a program obtained after extending a COPY statement of COBOL, an include statement of C, or C++, etc. A data item dictionary is explained later in detail.

2) The layout unit 4 calculates the relative displacement of the position in the layout of data items based on the item (outermost data item) which is not a component of any data item in the data items forming a hierarchical structure, and collects overlapping information about data items. At this time, the layout unit 4 considers the correction of an interval between data items depending on the program language describing a source program. Interval corrections between data items can be, for example, an idle byte or bit in COBOL, a word boundary in C or C++, etc. The layout is described later in detail.

3) The data item dictionary generation unit 3 generates a data item dictionary according to declaration information, collects the definition/reference information about data items, and sets the definition/reference information in the data item dictionary. For example, when WDATA11 which is one of the data items forming the record WREC01 is referred to in the source program shown in FIG. 7, the data item dictionary generation unit 3 sets the definition/reference information for the WDATA1 and the record WREC01 in the data item dictionary.

Then, the unused data item extraction unit 5 extracts data items (that is, record) having a hierarchical structure in the extracted data items (S2). For example, when the source program shown in FIG. 7 is optimized, the unused data item extraction unit 5 extracts the IREC01, WREC01, and WREC02 as a data item having a hierarchical structure.

When the unused data item extraction unit 5 cannot extract a data item having a hierarchical structure, that is, there is no data item having a hierarchical structure in the source program to be handled in the optimizing process (NO in S3), the process terminates.

When a data item having a hierarchical structure can be extracted (YES in S3), the unused data item extraction unit 5 extracts unused data items from data items having extracted hierarchical structures and data items (child items) forming data items according to the definition/reference information (not shown in FIG. 6).

The merge determination unit 6 generates an undetermined data item list based on the extraction result and the layout result of an unused data item, and determines whether or not some of the extracted unused data items can be merged into a smaller number of data items using the undetermined data item list (S4). The determination is described later in detail.

Then, the determination result notification unit 7 determines whether or not the optimizing apparatus 1 is set such that a determination result can be output (S5). If it is set such that a determination result can be output (YES in S5), the determination result notification unit 7 notifies the user of a determination result by the merge determination unit 6 (S6). Described below is an example of the contents of the determination result supplied to the user.

1) An item name, an item length, and a data type of a data item to be merged
2) An item name, an item length, and a data type of a merged data item
3) optimized program If it is not set such that a determination result can be output (NO in S5), then control is passed to S7.

If a merge instruction to merge data items which can be merged is set by the optimizing apparatus 1 in advance, or if the merge instruction reception unit 8 receives the user specification of data items to be merged after the determination result notification unit 7 notifies the user of a determination result (S7), then the data item merge unit 9 merges unused data items based on the determination result contained in the undetermined data item list (S8), thereby terminating the process.

Described below are the data item dictionary and the layout generated in S1. In the explanation, an example of a source program described in COBOL shown in FIG. 7 is appropriately referred to. The program description language used in the following explanation is not used to limit the program description language applicable in the present invention.

Figure 9:
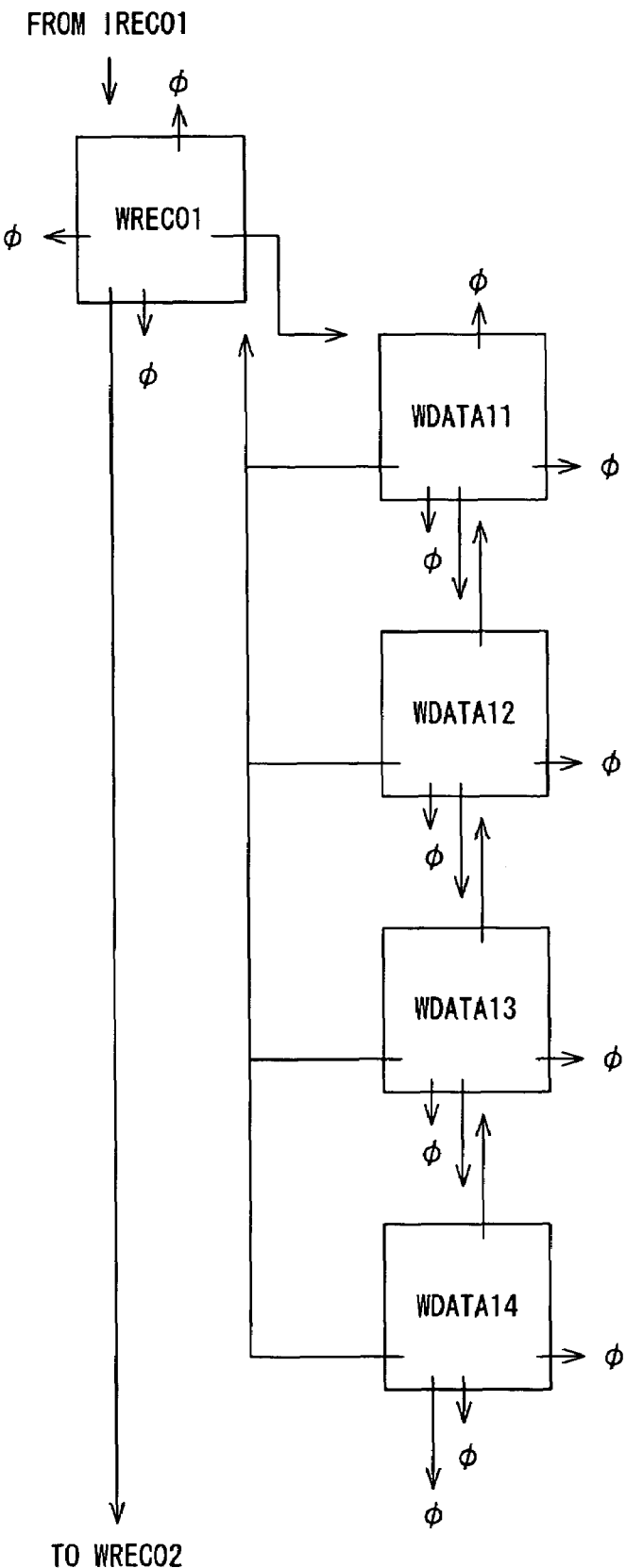
FIG. 9 is a view (2) of a data item dictionary of the source program shown in FIG. 7.
Figure 10:
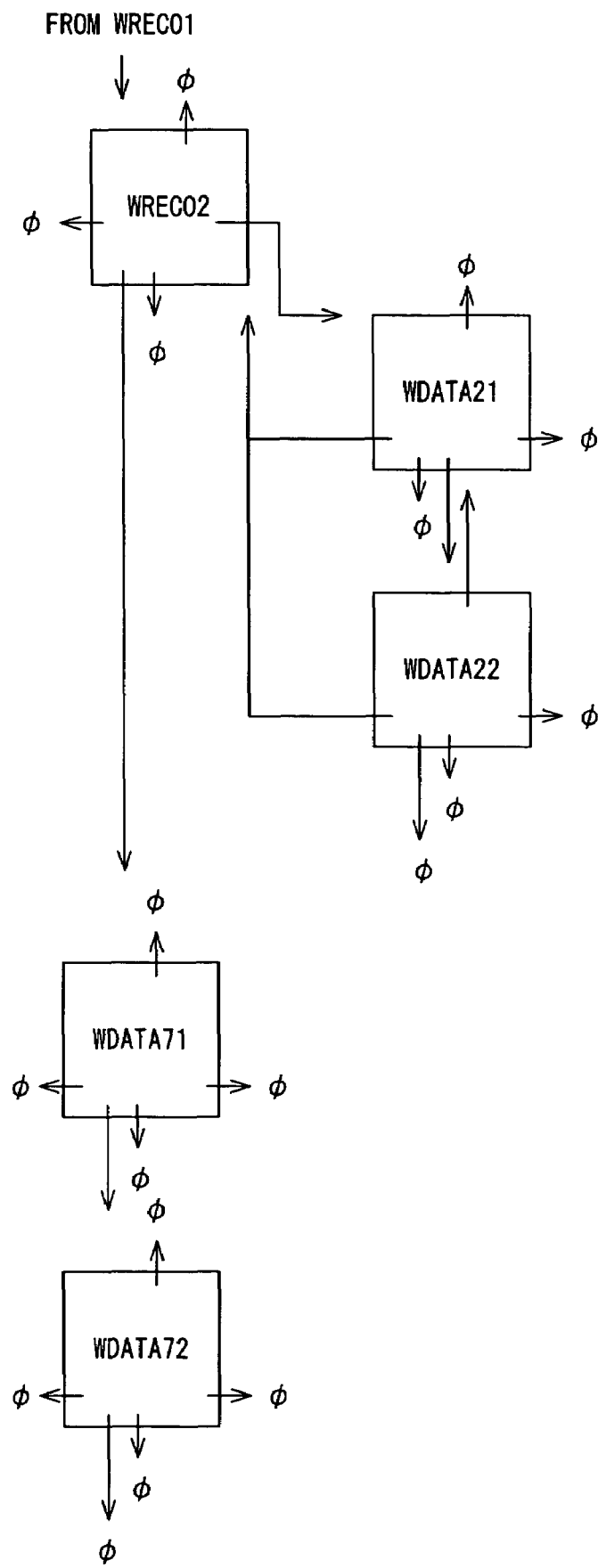
FIG. 10 is a view (3) of a data item dictionary of the source program shown in FIG. 7.

First, the data item dictionary is described below by referring to FIGS. 8 through 11. FIGS. 8 through 10 show a data item dictionary relating to data items declared in the source program shown in FIG. 7. As shown in FIGS. 8 through 10, the data item dictionary indicates the relationship between data items declared in the source program using a pointer.

FIGS. 11A and 11B show the notation method adopted in FIGS. 8 through 10 to describe a data item dictionary. As shown in FIG. 11A, in the data item dictionary shown in FIGS. 8 through 10, each data item is assigned five pointers. φ shown in FIG. 11B indicates that there are no corresponding values. The pointer indicates the following items.

1) A pointer pointing to the position (address) in which the parent item of the current data item is stored.
2) A pointer pointing to the position in which a data item positioned before the current data item is stored in assigning an address in the memory.
3) A pointer pointing to the position in which a leading data item in the memory in the data items which are child items of the current data item is stored.
4) A pointer pointing to the position in which a data item positioned after the current data item is stored in assigning an address in the memory.
5) A pointer pointing to the position in which other data items having no parent items are stored.

A child item refers to a data item forming a data items having a hierarchical structure. A parent item refers to a data item having the hierarchical structure formed by one or more other data items. For example, in the data item dictionary shown in FIGS. 8 through 10, the data items IDATA11, IDATA12, IDATA13, and IDATA14 forming the data item IREC01 are child items of the data item IREC01. Inversely, the data item IREC01 is a parent item of the data items IDATA11, IDATA12, IDATA13, and IDATA14.

Furthermore, the pointer pointing to the position in which other data items having no parent items described in 5) above are stored is required in performing the optimizing process. However, a method other than the above mentioned method using the pointers can also be adopted. For example, as shown in FIG. 11B, all data items can be connected in series regardless of the hierarchical relationship among data items.

The layout of data items is described below by referring to FIGS. 12 through 14. First, FIG. 12 shows the layout of the data items declared by the code described in lines 130 through 170 of the source program described in COBOL shown in FIG. 7. In the layout shown in FIG. 12, the interval between data items is not corrected.

FIG. 13 shows the layout of the data items declared by the following COBOL code. The record DATA11 is formed by the data items DATA21 and DATA22. The data item DATA21 is formed by the data items DATA31, DATA32, and DATA33. The data item DATA22 is formed by the data item DATA34. In the layout shown in FIG. 13, the layout unit 4 inserts an idle bit or an idle byte between the data items DATA 31 and DATA32, and after the data item DATA34.

```
01  DATA11.
02  DATA21.
03  DATA31     PIC X (5).
03  DATA32     PICS9 (4)    BINARY SYNCHRONIZED.
03  DATA33     PICS9 (4)    BINARY SYNCHRONIZED.
02  DATA22.
03  DATA34     PIC 1 (4)    BIT SYNCHRONIZED.
```

Figure 14:
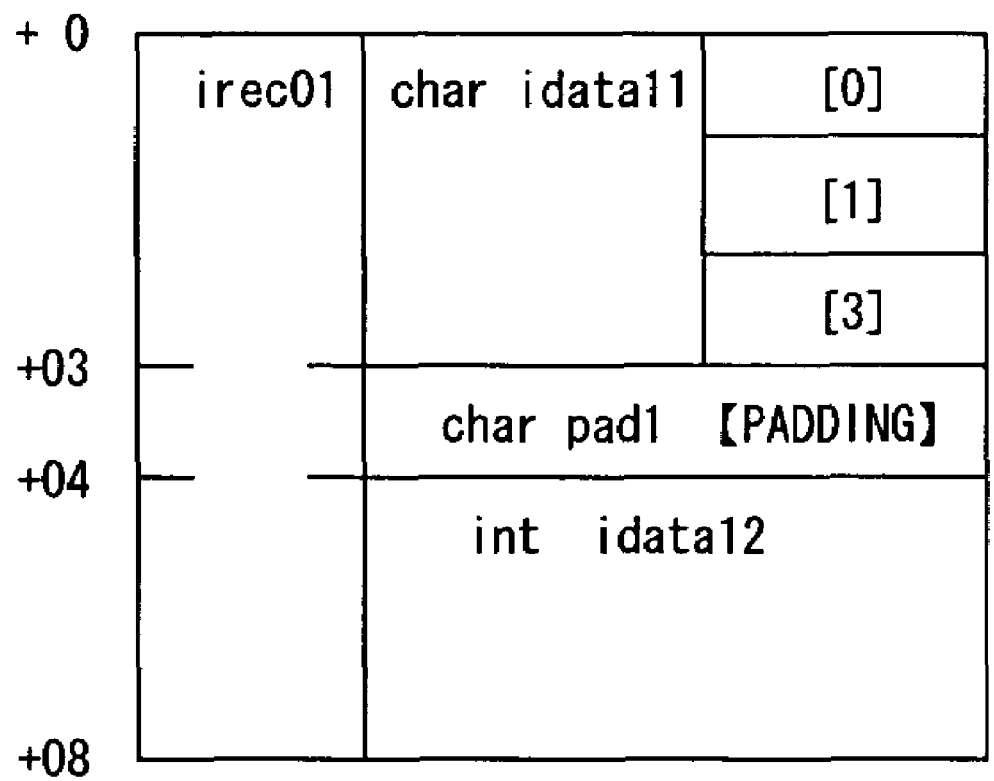
FIG. 14 is a view (3) of an example of the layout of a data item.

FIG. 14 shows the layout of the data items declared by the following code in C. As shown by the following code, the record irec01 is formed by the data items idata11 and idata12. In the layout shown in FIG. 14, a blank byte called padding is provided for alignment between the variable idata11 for storing a character and the variable idata12 for storing an integer. In some program environments, it is necessary that a leading address in the memory assigned to a data item can be divided by a given integer depending on the data type. This is called "alignment". The system of alignment depends on a process system.

```
struct {
    char idata11[3];
    int idata12 ;
} irec01;
```

Then, the outline of the merge determining process in S4 shown in FIG. 6 is described. The above mentioned merge determining process is performed as follows.
1) First, the merge determination unit 6 extracts a data item having a hierarchical structure, that is, a record, from a source program. In the case of the source program shown in FIG. 7, the following data items are extracted.
   IREC01, WREC01, WREC02
2) Then, the merge determination unit 6 extracts an unused data item according to the definition/reference information about the data item for the data item extracted in 1) above. In the case shown in FIG. 7, the following data items are extracted.
   IREC01, IDATA11, IDATA12, IDATA13, IDATA14
   WDATA12, WDATA13
   WREC02, WDATA21, WDATA22
3) The consecutiveness of data items is determined for the unused data items extracted in 2) above.

The determination in 3) above is performed by selecting the two data items (hereinafter referred to as items A and B) from the unused data items (hereinafter referred to as an undetermined data item) which have not been determined. There are the following two types of data item merging methods. One is a back-and-forth direction merge, and the other is a set direction merge. There are also two types of determination conditions corresponding to the respective merging methods. The two types of merges are described below.

a) Back-and-forth Direction Merge
   A back-and-forth direction merge refers to a merge of a plurality of data items at the same hierarchical level in the hierarchical structure of a data item. The merging conditions are described below.
   Having the same parent item.
   Having no child items
   The "relative displacement of item A in the layout+item length of item A" matches the "relative displacement of item B in the layout". When they match, the items A and B are adjacent (consecutive) in the layout. When an idle byte or an idle bit, etc. is used for correction, there are the conditions that the "relative displacement of item A in the layout+item length of item A+correction value" matches the "relative displacement of item B in the layout".

In the back-and-forth direction merge, a merged data item is represented as follows.
A merged data item has no name (no data item name), or has a data item name generated by the data item merge unit 9.
To make the item length of a merged data item match the item length of the data item before the merge, the sum of the item lengths of a plurality of data items to be merged is defined as a data item length of the merged data item. When the layout is corrected by the optimizing apparatus 1 using an idle byte, an idle bit, or padding depending on the program language, the correction is to be considered.
The data type of a merged data item is to be the same as the data type before the merge, or the type of data having the smallest storage area size. In the latter case, although the data types of a plurality of data items to be merged do not match, the merging process can be performed.

The back-and-forth direction merge is described below by referring to FIGS. 15A to 15D.
The layout of the data item declared by the following code and the data item dictionary are shown in FIGS. 15A and 15B.

```
01   A1.
02   B1       PIC X (10).
02   B2       PIC X (10).
```

When the data items B1 and B2 are unused data items, the above mentioned code is represented as follows by performing the back-and-forth direction merge on the data items B1 and B2. The layout and the data item dictionary shown in FIGS. 15A and 15B are respectively shown in FIGS. 15C and 15D. As shown in FIGS. 15C and 15D, it is proved that the number of data items can be reduced by the back-and-forth direction merge.

```
01   A1.
02   FILLER   PIC X (20).
``` b) Set Direction Merge
   A set direction merge refers to a merge of a plurality of data items having different hierarchical structures (inclusion relation).
   The following merging conditions are set.
   The item A is a parent item of the item B.
   The "item length of the item A" matches the "item length of the item B".

In the set direction merge, a merged data item is represented as follows.
A merged data item has no name (no data item name), or has a data item name generated by the data item merge unit 9.
The item length of a merged data item is equal to the item length of the item B.
The data type of a merged data item is the data type of the item B.
The set direction merge is described below by referring to FIGS. 16A to 16D.

The layout of data items declared by the following code and the data item dictionary are represented as shown in FIGS. 16A and 16B.

| | | |
|---|---|---|
| 01 | A1. | |
| 02 | FILLER | PIC X (20). |

When the data items A1 and FILLER are unused data items, the above mentioned code is represented as follows by performing a set direction merge on the data items A1 and FILLER. Furthermore, the layout and the data item dictionary shown in FIGS. 16A and 16B are changed as represented as shown in FIGS. 16C and 16D. As shown in FIG. 16C, it is proved that the number of data items has been reduced.

01 FILLER PIC X(20)

There can be the case in which an unused data item has a hierarchical structure of two or more hierarchical levels. In this case, a process may not be sufficiently performed in one optimizing process. Therefore, it is necessary to repeatedly perform the above mentioned determining process. When the process is repeatedly performed, the optimizing process is performed on all extracted unused data items on the following conditions.

A data item having deeper levels is merged by priority.
After performing the set direction merge, the back-and-forth direction merge is performed, thereby recursively making determination.

The processing of data items having two or more hierarchical levels is described below by repeating the determining process by referring to actual code.

First, the following initial code is assumed. For explanation, all data items declared by the code are assumed to be unused data items.

| | | |
|---|---|---|
| 01 | A1. | |
| 02 | B1. | PIC X (20). |
| 02 | B2. | |
| 03 | C1 | PIC X (10). |
| 03 | C2 | PIC X (10). |
| 02 | B3. | PIC X (20). |

In the first optimizing process, the data items C1 and C2 having the deepest hierarchical levels are merged. Therefore, the above mentioned initial code is represented as follows.

| | | | |
|---|---|---|---|
| 01 | A1. | | |
| 02 | B1. | PIC X (20). | |
| 02 | B2. | | |
| 03 | FILLER | PIC X (20). | *> |
| 02 | B3. | PIC X (20). | |

(*> first: back-and -forth direction merge)

Furthermore, when the second optimizing process is performed on the code after the first optimizing process, the data item B2 and the FILLER item are merged. As a result, the following code after the second optimizing process is obtained.

| | | | |
|---|---|---|---|
| 01 | A1. | | |
| 02 | B1. | PIC X (20). | |
| 02 | FILLER | PIC X (20). | *> |
| 02 | B3. | PIC X (20). | |

(*> second: set direction merge)

Furthermore, when the third optimizing process is performed on the code after the second optimizing process, the data item B1 and the FILLER item are merged. As a result, a code after the following third optimizing process can be obtained.

| | | | |
|---|---|---|---|
| 01 | A1. | | |
| 02 | FILLER | PIC X (40). | *> |
| 02 | B3. | PIC X (20). | |

(*> third: back-and forth direction merge)

Furthermore, when the fourth optimizing process is performed on the code after the third optimizing process, the data item B3 and the FILLER item are merged. As a result, a code after the following fourth optimizing process can be obtained.

| | | | |
|---|---|---|---|
| 01 | A1. | | |
| 02 | FILLER | PIC X (60). | *> |

(*> fourth: back-and-forth direction merge)

Finally, when the fifth optimizing process is performed on the code after the fourth optimizing process, the data item A1 and the FILLER item are merged. As a result, a code after the following fifth optimizing process can be obtained.

| | | | |
|---|---|---|---|
| 01 | FILLER | PIC X (60). | *> |

(*> fifth: set direction merge)

Since the code after the fifth optimizing process cannot be merged any more, the process terminates.

Described below is a merge determination by the merge determination unit 6 in detail. The merge determination is made on an unused data item extracted by the unused data item extraction unit 5 immediately before S4 shown in FIG. 6. In a merge determination, the merge determination unit 6 uses the undetermined data item list for management of an undetermined data item and a determination result. The undetermined data item list includes the information about an undetermined data item and a determination result, a pointer to a data item dictionary, and a pointer to a data item to be determined next.

Figure 17:
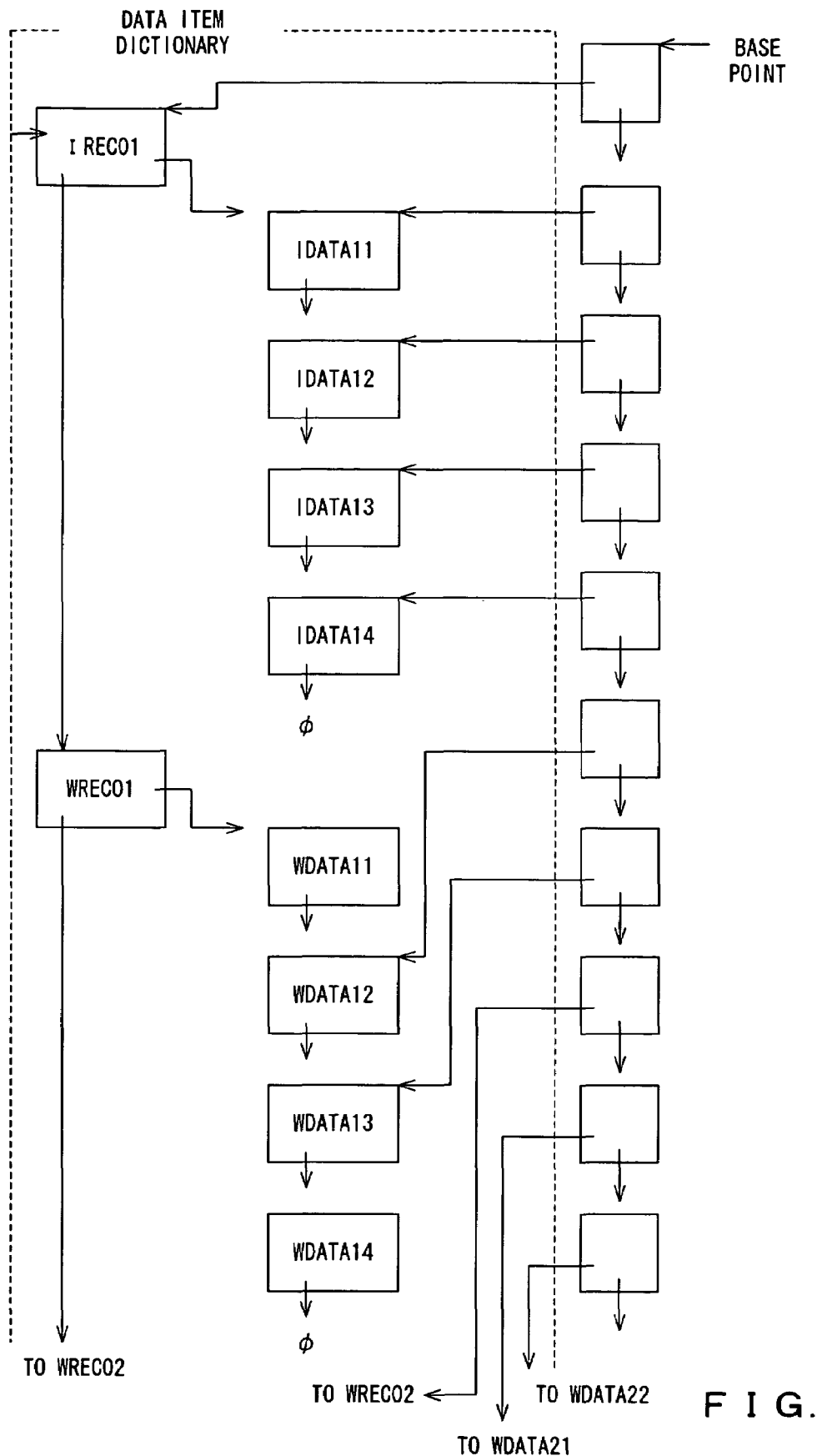
FIG. 17 is a view (1) for explanation of a pointer included in an undetermined data item list.
Figure 18:
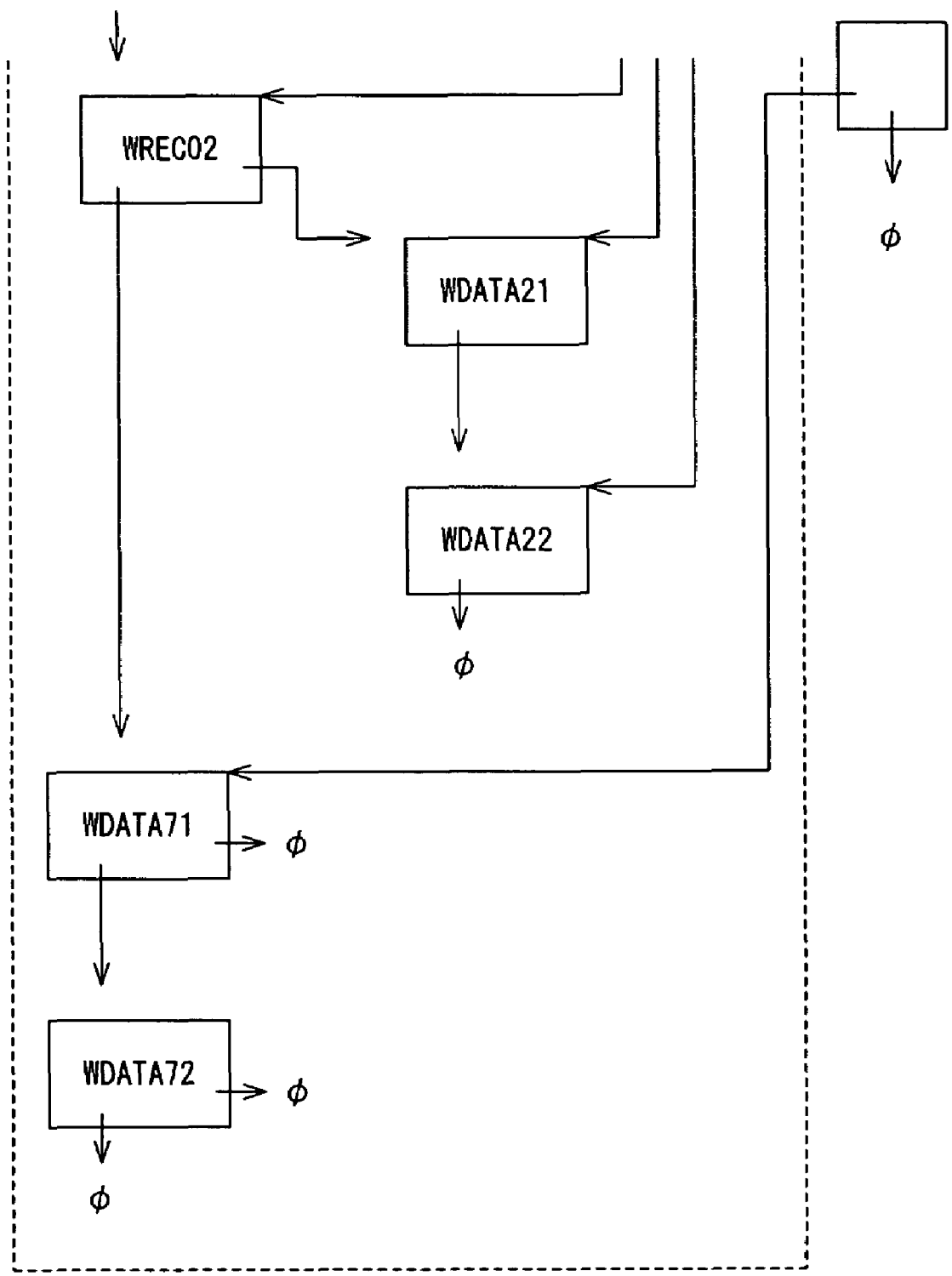
FIG. 18 is a view (2) for explanation of a pointer included in an undetermined data item list.

FIGS. 17 and 18 show a pointer to the undetermined data item list relating to the source program shown in FIG. 7. In FIGS. 17 and 18, φ indicates that there are no corresponding values. FIG. 19 shows the notation of a pointer used in FIGS. 17 and 18, and the detailed information other than the pointer contained in the undetermined data item list. As shown in FIG. 19, the information contained in the undetermined data item list are listed below.

1) Information about whether or not a data item is undetermined (hereinafter referred to as status information).

2) Information about whether or not merge-enabled or deletion-enabled (hereinafter referred to as determination result information)
3) Item length of a merged data item (hereinafter referred to as item length information)
4) Data type of a merged data item (hereinafter referred to as type information)
5) Item name of a data item set as items A and B In FIGS. 17 and 18, the data item pointed to as a data item to be determined is a data item determined as an unused data item by the unused data item extraction unit 5 immediately before S4 shown in FIG. 6. The data item to be determined for a merge is selected based on the pointer contained in the undetermined data item list. The determination result contained in the undetermined data item list is referred to by the data item merge unit 9 when data item are merged.

The flow of the process performed in determining a merge is described below by referring to the flowchart shown in FIGS. 20 and 21.

First in the merge determination, the merge determination unit 6 defines the status information about the data items in the undetermined data item list as "undetermined", thereby entering an unset state of the items A and B to be handled in the determining process (S11 and S12). Then, the merge determination unit 6 determines whether or not there is an undetermined data item by referring to the status information in the undetermined data item list (S13). If the merge determination is performed for all data items (NO in S13), then control is passed to S42 (described later). If there is an undetermined data item, then the merge determination unit 6 retrieves a data item from the undetermined data items based on the pointer contained in the undetermined data item list (S14). For example, when the source program shown in FIG. 7 is optimized, the data item IREC01 is first retrieved.

Then, the merge determination unit 6 determines whether or not the item A has already been set according to the status information in the undetermined data item list (S15). If the item A has not been set yet (YES in S15), then the merge determination unit 6 sets the status information about the retrieved data item in the undetermined data item list as "determined", thereby setting the data item as an item A (S16). After the setting in S16, control is returned to S13. If the item A has already been set, the merge determination unit 6 sets the retrieved data item as an item B (S17) Since the setting in S17 is similar to the setting in S16, the explanation is omitted here.

After the items A and B are set, the merge determination unit 6 determines based on the data item dictionary whether or not the item A is a parent item of the item B (S18). If the item A is the parent item of the item B (YES in S18), then the merge determination unit 6 returns to "undetermined" the status information about the data item set as the item B in the undetermined data item list, thereby returning the item B to the unset status. Furthermore, the merge determination unit 6 performs a recursive call using as an argument the pointer in the undetermined data item list pointing to the item to be determined next. After the recovery from the recursive call, control is passed to S20 shown in FIG. 21. If the item A is not the parent item of the item B (NO in S18), then the merge determination unit 6 enters S27 shown in FIG. 18.

In S20, after the recovery from the recursive call, the merge determination unit 6 determines whether or not the item A has a child item other than the item B according to the undetermined data item list and the data item dictionary. If a child item is set as "deletion-enabled" in the determination result information in the undetermined data item list although the child item is contained in the data item dictionary, then the merge determination unit 6 processes the child item as a non-existing child item.

If the item A has no child items other than the item B (YES in S20), control is passed to S21, and the set direction merge is performed on the items A and B.

In S21, the merge determination unit 6 sets the data type of the item B in the type information about the item A in the undetermined data item list. Additionally, the merge determination unit 6 sets "merge-enabled" in the determination result information about the item A in the undetermined data item list (S22), and sets "deletion-enabled" in the determination result information about the item B (S23). The merge determination unit 6 further sets the item length of the item B in the item length information about the item A. Then, the merge determination unit 6 defines the item B as unset (S24), thereby control is returned to S13.

Figure 20:
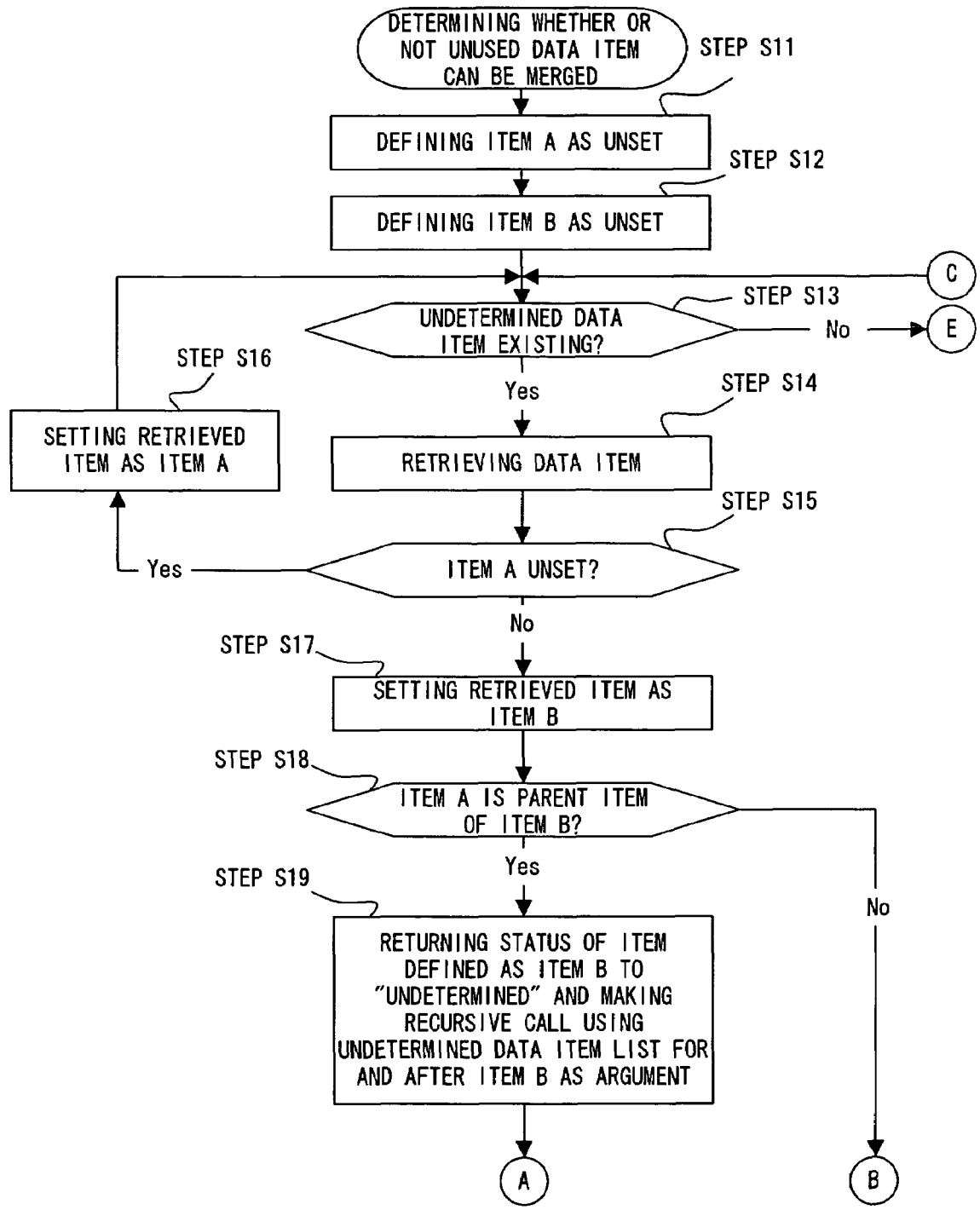
FIG. 20 is a flowchart (1) of the procedure of determining a merge.

If the item A has a child item other than the item B (NO in S20), then the merge determination unit 6 defines the items A and B as unset (S25 and S26), thereby returning control to S13 shown in FIG. 20.

If the item A is not the parent item of the item B in S18 described above (NO in S18), then the merge determination unit 6 determines in S27 whether or not the items A and B have the same parent item. If the items A and B have the same parent item (YES in S27), then control is passed to S28. Otherwise (NO in S27), control is passed to S38 shown in FIG. 23.

In S28, the merge determination unit 6 determines whether or not the item B has a child item based on the undetermined data item list and the data item dictionary (S28). The determination in S28 is similar to the determination in S20.

When the item B has a child item (YES in S28), a recursive call is made using as an argument the pointer pointing to the data item to be determined next in the undetermined data item list (S29), thereby passing control to S30. If the item B has no child items (NO in S28), then control is passed to S30 without performing the process in S29. If the item B has a child item (NO in S30), then control is passed to S37.

In S30, the merge determination unit 6 determines whether or not the item B has a child item. If the item B has no child items (YES in S30), then the merge determination unit 6 determines based on the layout generated by the layout unit 4 whether or not the area storing the item A and the area storing the item B are consecutive areas (S31). If the area storing the item A and the area storing the item B are consecutive areas, then control is passed to S32, and the back-and-forth direction merge is performed on the items A and B. Otherwise, control is passed to S37.

In S32, the merge determination unit 6 computes the item length of a merged data item by adding the item length of the item B to the item length of the item A based on the data item length of the data item shown in the layout. Then, the merge determination unit 6 sets the computed item length in the item length information about the item A. When any correction such as an idle bit, an idle byte, padding, etc. is made during layout, the correction value is added to the sum of the item length of the item A and the item length of the item B, thereby computing the length of the merged item.

Then, the merge determination unit 6 sets the type information about the item A in the undetermined data item list as the data type having the smallest storage area size (S33). Thus, the data type of the merged data item is determined. When the data type of the item A is the same as the data type of the item B, the data type can be kept unchanged.

Furthermore, the merge determination unit 6 sets the determination result information in the undetermined data item list as "merge-enabled" (S34), and sets the determination result information of the item B as "deletion-enabled" (S35). Then, the merge determination unit 6 defines the item B as unset (S24), and control is returned to S13 shown in FIG. 20 On the other hand, if the determination is NO in S30 or S31, the merge determination unit 6 sets as the item A again the data item currently set as the item B, and defines the item B as unset. Then, control is returned to S13 shown in FIG. 20.

When the determination in S27 is NO, the merge determination unit 6 determines whether or not a recursive call has been made (S38). If a recursive call has not been made (YES in S38), then the merge determination unit 6 sets as the item A the data item currently set as the item B (S39), and also sets the item B as unset (S40). Then, control is returned to step S13. If a recursive call is made (NO in S38), the merge determination unit 6 sets as "undetermined" the status information about the data item currently set as the item B, and control is returned to the caller of the recursive call (S41). Furthermore, control is returned to the caller, that is, the caller of the recursive call or the main flow (S42), thereby terminating the determining process.

FIGS. 24 through 31 show the setting contents of the items A and B, and the contents of the undetermined data item list when a merge process is performed for the source program shown in FIG. 7. FIGS. 24 through 27 show the level number for identification of a level, a step number for identification of the procedure of the determining process, an item name of the data item stored in the primary storage area retrieved by the merge determination unit 6, an item name of the data item set as an item A, an item name of the data item set as an item B, the status information and the determination result information in the undetermined data item list. In FIGS. 24 through 31, φ indicates "no corresponding data". The numeric character enclosed by the parentheses after the step number indicates the presence/absence of a recursive call. If the numeric character enclosed by the parentheses is 0, then there is no recursive call. If it is 1, then a recursive call has been made (it is necessary to return to the step of the caller).

The notation of the undetermined data item list in FIGS. 24 through 31 is shown below. The description of the information other than the status information and the determination result information is omitted.

data item name (status information, determination result information)
   status information:
      undetermined
      determined
   determination result information:
      merge-enabled
      deletion-enabled For example, IREC01 (determined, merge-enabled) indicates that the data item IREC01 is "determined", and the determination result is "merge-enabled".

The merge determination is practically explained below by referring to FIGS. 24 through 31.

For example, in S00 at the stage 1 (before performing the determining process), the undetermined data items can be:
   IREC01, IDATA11, IDATA12, IDATA13, IDATA14, WDATA12, WDATA13, WREC02, WDATA21, WDATA22

Then, at the stages 2 and 3, the steps S11 and S12 are performed respectively to define the items A and B as unset. At the stage 4, step S14 is performed to retrieve the data item IREC01 and store it in a temporary storage area. At the stage 5, step S15 is performed to set the status information of IREC01 from "undetermined" to "determined". Then, at the stages 6 and 7, the data item IDATA11 is retrieved from the undetermined data item list and set as an item B, a recursive call is made, and control is passed to S0 (during recursive call).

At the stages 8 through 14, the items A and B are set. As shown at the stage 14 shown in FIG. 25, the data items set as the items A and B are IDATA11 and IDATA12 respectively. As clearly shown by the data item dictionary in FIG. 17, IDATA11 and IDATA12 are not in the set relationship, and IDATA12 has no child items. Therefore, the processes in S27 through S36 are performed at the stages 15 through 17. As a result, at the stage 17 as shown in FIG. 26, the status information and the determination result information about the IDATA11 are set as "determined" and "merge-enabled" respectively, and the status information and the determination result information about the IDATA12 are set as "determined" and "deletion-enabled" respectively. That is, IDATA11 and IDATA12 are set for the back-and-forth direction merge. Furthermore, the item B is defined as unset.

Figure 22:
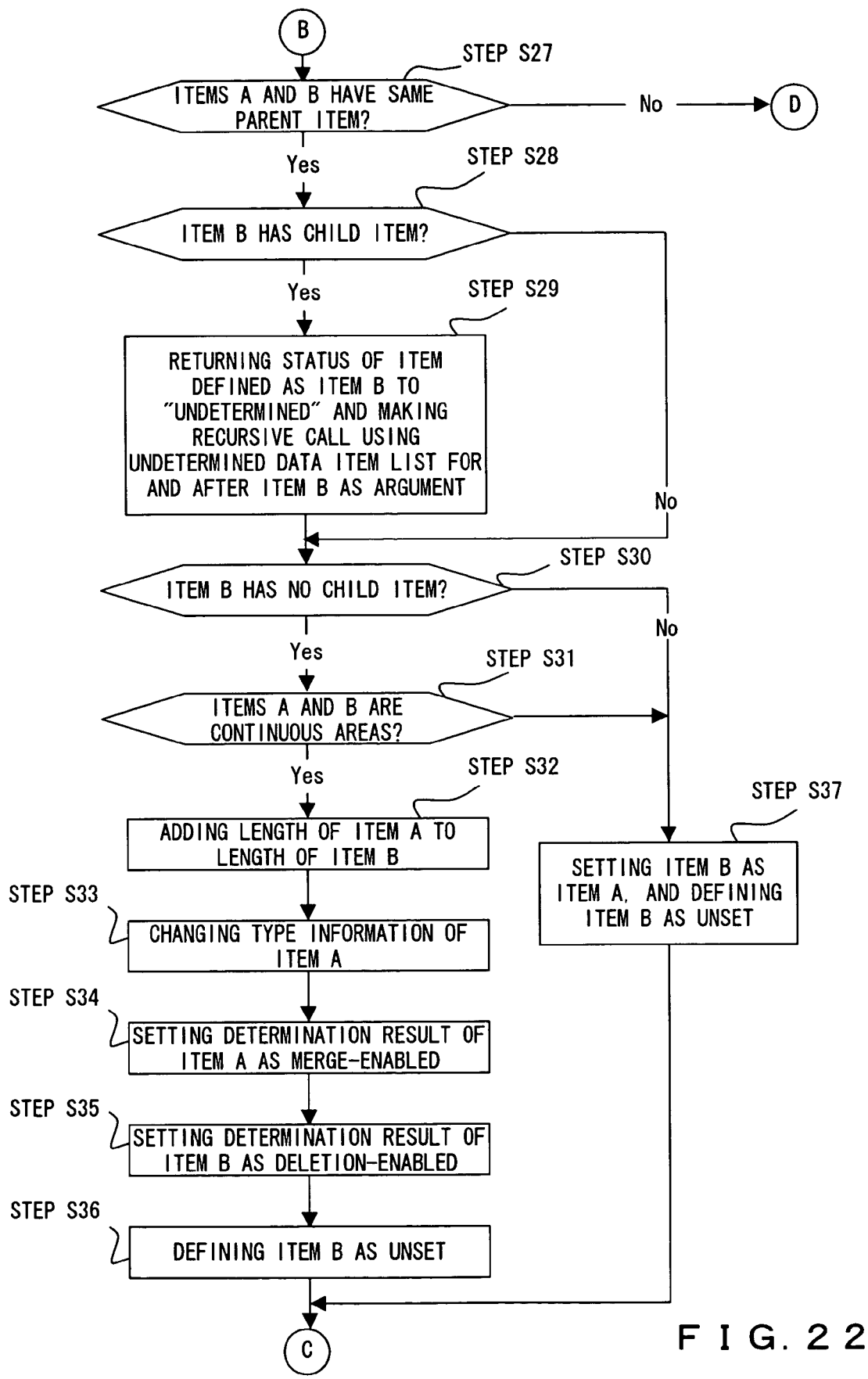
FIG. 22 is a flowchart (3) of the procedure of determining a merge.
Figure 23:
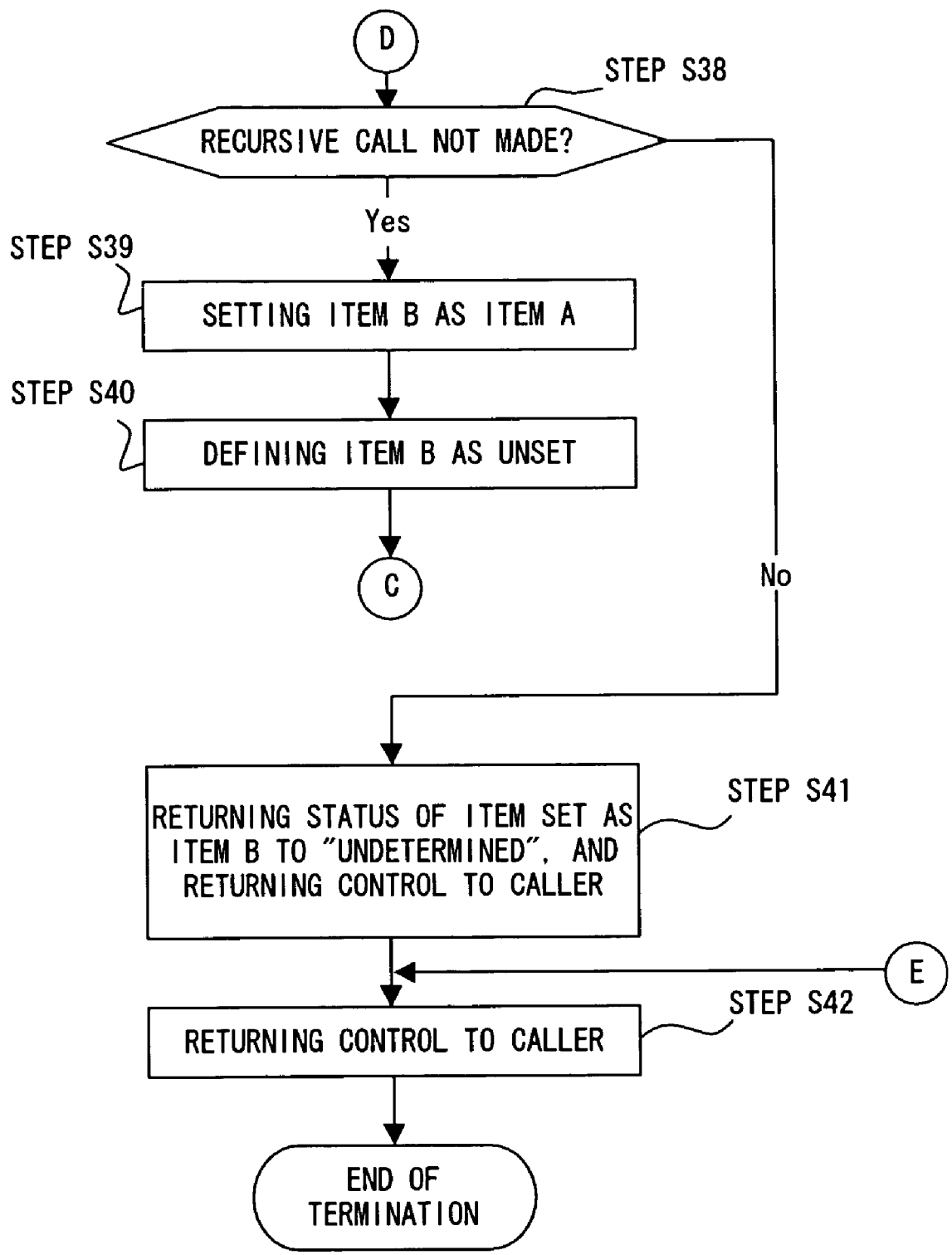
FIG. 23 is a flowchart (4) of the procedure of determining a merge.

At the stages 18 through 21 shown in FIG. 22 after the stage 17 shown in FIG. 36, the IDATA11 and IDATA12 are set for the back-and-forth direction merge by performing S13 through S26 as described above. Furthermore, at the stages 22 through 25 shown in FIG. 27, the IDATA11 and IDATA14 are set as merge-enabled for the back-and-forth direction merge as described above. Then, by performing S13 through S17 from the stages 26 and 27 shown in FIG. 27 after the stage 25 shown in FIG. 27, WDATA12 is set as an item B. Since IDATA11 is not a parent item of WDATA12 (NO in the determination in S18), and the parent item of IDATA11 is not the same as the parent item of WDATA12 (NO in the determination in S27), S41 is performed at the stage 28 shown in FIG. 27, thereby control is returned to the caller S19. At this time, the items A and B are IREC01 and IDATA11 set during recursive call.

IREC01 is the parent item of IDATA11, and has no child items other than IDATA11 as a result of the back-and-forth direction merge as described above. Therefore, at the stages 29 through 31 shown in FIG. 28, S22 through S24 are performed. As a result, as shown in FIG. 28, the status information and the determination result information of IREC01 are respectively set as "determined" and "merge-enabled", and the status information and the determination result information of IDATA11 are respectively set as "determined" and "deletion-enabled" at the stage 31. That is, it is determined that the back-and-forth direction merge can be performed for IREC01 and IDATA11. Furthermore, the item B is defined as unset. By the merge determination so far, it is determined that the data items IREC01, IDATA11, IDATA12, IDATA13 can be merged to be one data item.

By performing S13 through S17 at the stages 32 and 33 shown in FIG. 28 after the stage 31 shown in FIG. 28, IREC01 is set as an item A, and WDATA12 is set as an item B. However, since IREC01 is not the parent item of WDATA12, and the parent item of IREC01 is not the same as the parent item of WDATA12, it is determined that these items cannot be merged. As a result, by performing S39 and S40 at the stages 34 and 35 shown in FIG. 28, WDATA12 is set again as an item A, and an item B is unset, thereby returning control to S13. Afterwards, as described above, it is determined that the back-and-forth direction merge can be performed on WDATA12 and WDATA13 in the four data items forming the data item WREC01 from the stage 36 shown in FIG. 29 to the stage 40 shown in FIG. 30. Furthermore, from the stage 41 shown in FIG. 30 to the stage 59 shown in FIG. 31, it is determined that the back-and-forth direction merge and the set direction merge can be performed on the data item WREC02 and the two data items forming the data item.

The determination result stored in the undetermined data item list is transmitted to the user by the determination result notification unit 7. When the merge instruction reception unit 8 receives a merge instruction from a user, the data item merge unit 9 merges the data items based on the determination result, thereby optimizing the source program.

FIG. 32 shows a program obtained by optimizing the source program shown in FIG. 7. In lines 130 through 170 of the source program shown in FIG. 7, the following five data items are declared. As clearly indicated by the description of the procedure division of the source program shown in FIG. 7, these data items are unused data items.
IREC01
DATA11 (data type: character data, item length: 20)
DATA12 (data type: character data, item length: 20)
DATA13 (data type: character data, item length: 20)
DATA14 (data type: character data, item length: 20)

As a result of the merge, it is indicated in line 130 shown in FIG. 32 that these data items are replaced with one FILLER item having the item length of 80, whose data type is character data. That is, since five data items are merged into one data item, the number of items is reduced.

Similarly, the two data items WDATA12 and WDATA13 which are declaired in lines 210 and 220 in the source program shown in FIG. 7, and are numeric data each having the item length of 2 are merged into one FILLER item of numeric data having the item length of 4 as a result of the optimizing process. Furthermore, the three data items declared in lines 240 through 260 of the source program shown in FIG. 7 are merged into one FILLER item.

In this example, when a plurality of data items to be merged are the same in data type, the data type of the merged data item is the same as the data items to be merged. However, the data type of the merged data item can be the data type for the smallest storage area. In any case, since the item length of the merged FILLER item is set for the length of the merged data item, the address in the memory of the merged data item is not changed. Therefore, a plurality of data items which are part of a record do not cause the problem that the address in the memory of the data items is shifted.

The above mentioned optimizing apparatus 1 can further comprise an unused data item deletion unit (not shown in the attached drawings) for realizing the function of deleting the code for definition of an unused data item. Since the function of deleting the code for definition of an unused data item has been conventionally assigned to a compiler, etc., the detailed explanation is omitted here.

In the optimizing apparatus 1 comprising the unused data item deletion unit, the unused data item deletion unit deletes the code for declaration of an unused data item from the source program to be manipulated in the optimizing process before merge determination of data items, thereby performing a preprocess for merge determination, and storing the preprocessed source program in the program storage unit 11. By performing the preprocess, the number of unused data items to be processed in the merge determination can be reduced.

Then, as described above, the data item extraction unit 2, the data item dictionary generation unit 3, the layout unit 4, the unused data item extraction unit 5, the merge determination unit 6, and the data item merge unit 9 merge the unused data items in the preprocessed source program retrieved from the program storage unit 11. Furthermore, the unused data item deletion unit again deletes the code for declaration of an unused data item from the source program for merging the unused data items.

FIG. 33 shows the result of deleting an unnecessary definition code after merging the unused data items from the source program shown in FIG. 7. As shown in FIG. 33, the optimizing apparatus 1 has a smaller number of unused data items in the source program as compared with the deletion result of the unnecessary definition code in the conventional technology shown in FIG. 2.

FIG. 34 shows an example of a source program described in C language. The source program shown in FIG. 34 corresponds to the source program described in COBOL shown in FIG. 7. As the source program described in COBOL, the unused data items in the source program described in C language can be merged. If the source program shown in FIG. 34 can be optimized by merging the unused data items, the source program as shown in FIG. 35 is obtained. Since there are no data items corresponding to the FILLER item of COBOL in C language, the item name of the merged data item is the same as the item name of the data item having the first address on the layout in the data items to be merged in FIGS. 34 and 35. The data type "short" (single precision integer data) is assumed to be 2 bytes.

As shown in FIGS. 34 and 35, the number of unused data items in a source program described in C language can be reduced as in the source program described in COBOL language. That is, the optimizing apparatus 1 can perform the optimizing process independent of the language.

The optimizing apparatus 1 described above can be configured by a computer. The configuration of the computer is described below by referring to FIG. 36.

As shown in FIG. 36, a computer 20 comprises a CPU 21, memory 22, an input device 23, an output device 24, an external storage device 25, a medium drive device 26, and a network connection device 27, and these components are interconnected through a bus 28.

The memory 22 contains, for example, ROM (read only memory), RAM (random access memory), etc., and stores a program and data used in processing. A source program read from each storage unit 15, 16, or 17 is temporarily stored in the memory 22. The data item extracted by the data item extraction unit 2 is laid out by the layout unit 4 on the memory 22. The data item extraction unit 2, the data item dictionary generation unit 3, the layout unit 4, the unused data item extraction unit 5, the merge determination unit 6, the determination result notification unit 7, the merge instruction reception unit 8, and the data item merge unit 9 forming the optimizing apparatus 1 are stored as a program in the specific program code segment of the memory 22 of the computer 20. Furthermore, the unused data item deletion unit can also be designed to be stored as a program in the program code segment of the memory 22 of the computer 20. The CPU 21 performs a necessary process by performing the above mentioned program using the memory 22.

The input device 23 can be, for example, a keyboard, a pointing device, a touch panel, etc., and is used in inputting a user instruction and information. The output device 24 can be, for example, a display, a printer, etc., and is used in outputting an inquiry to a user of a computer, a process result, etc. The input device 23 and the output device 24 correspond to the input/output unit 10 shown in FIG. 5.

The external storage device 25 can be, for example, a magnetic disk device, an optical disk device, a magneto-optical disk device, etc. The external storage device 25 realizes a program storage unit 11, a data item dictionary storage unit 12, and an undetermined data item list storage unit 13. Furthermore, the above mentioned program can be stored in the external storage device 25 of the computer 20, and can be loaded into the memory 22 for use as necessary.

The medium drive device 26 drives a portable storage medium 29 and accesses the stored contents. The portable storage medium 29 can be any computer-readable storage medium such as a memory card, a memory stick, a flexible disk, CD-ROM (compact disc read only memory), an optical disk, a magneto-optical disk, a DVD (digital versatile disk), etc. The above mentioned program can be stored in the portable storage medium 29, and loaded into the memory 22 of the computer 20 for use as necessary.

The network connection device 27 communicates with an external device through any network (line) such as a LAN, a WAN, etc. for data conversion required in communications. Furthermore, the above mentioned program is received from an external device as necessary, and loaded into the memory 22 of the computer 20 for use as necessary.

Figure 37:
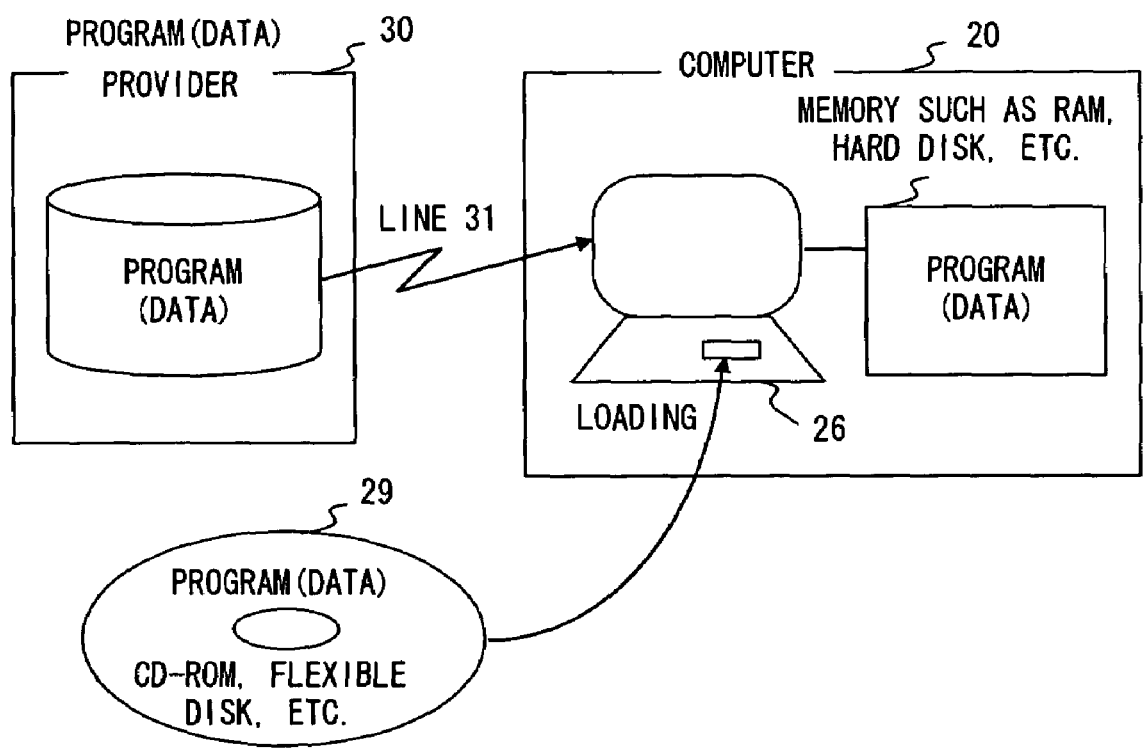
FIG. 37 shows loading data and a program into a computer.

FIG. 37 shows the loading of a program into the computer shown in FIG. 36.

A program used to direct a computer to realize the functions corresponding to the optimizing apparatus 1 can be input directly from the input device 23 of the computer, but can also be loaded into the computer as follows. For example, the computer-readable portable storage medium 29 stores the above mentioned program in advance. Then, as shown in FIG. 37, the program is read by the computer from the portable storage medium 29, and temporarily stored in the memory 22 of the computer or the external storage device 25. To allow the computer to perform the optimizing process, the stored program is read by the CPU 21 of the computer for execution.

Furthermore, a program can be downloaded to the computer from the DB of a program (data) provider 30 through a communications line (network) 31. In this case, for example, the transmitting computer of the program (data) provider 30 converts program data representing a program into a program data signal, the converted program data signal is modulated by a modem to obtain a transmission signal, and the obtained transmission signal is output to the communications line 31 (transmission medium). In the computer for receiving a program, the transmission signal received by the modem is demodulated, thereby obtaining a program data signal, and the obtained program data signal is converted to obtain program data. If the communications line 31 (transmission medium) connecting the transmitting computer to the receiving computer is a digital line, a program data signal can be communicated.

Described above are the embodiments of the present invention, but the present invention is not limited to the above mentioned embodiments, but can be any variation. The above mentioned optimizing apparatus 1 can be applied to a compiler, etc. Thus, the memory requirement for a compiler can be reduced, thereby efficiently performing a compiling process. Furthermore, the optimizing apparatus 1 can be used in generating a data item dictionary.

As described above in detail, according to the present invention, the number of unused data items can be reduced by merging a plurality of unused data items forming a data item having a hierarchical structure into one data item based on the hierarchical level in the hierarchical structure and the arrangement of the data items in the memory. Then, a program can be optimized such that the necessary memory requirement during compilation or generation of a data item dictionary can be reduced.

While the invention has been described with reference to the preferred embodiments thereof, various modifications and changes may be made to those skilled in the art without departing from the true spirit and scope of the invention as defined by the claims thereof.

What is claimed is:

1. A computer-readable medium storing a program used to direct a computer to perform optimization process of the program, the process comprising: extracting data items from the program; laying out the data items in memory provided in the computer; extracting defined but unused data items from the extracted data items; determining whether or not a plurality of data items forming at least a part of a data item having a hierarchical structure in the unused data items can be merged into a new data item based on the layout result; and outputting a program in which the plurality of data items are merged into the new data item based on the determination result, wherein the number of unused data items is reduced by merging a plurality of unused data items forming a data item having a hierarchical structure into one data item based on the hierarchical level in the hierarchical structure and the arrangement of the data items in the memory;

the program is optimized such that the necessary memory requirement during compilation or generation of a data item dictionary is reduced.

2. The computer-readable medium according to claim 1, the process further comprising: said plurality of unused data items to be merged are laid out in adjacent areas in the memory.

3. The computer-readable medium according to claim 2, the process further comprising: said plurality of unused data items to be merged are data items forming a part of another data item having a hierarchical structure, and located in an identical hierarchical level in the hierarchical structure.

4. The computer-readable medium according to claim 1, the process further comprising: said plurality of unused data items to be merged are a data item having a hierarchical structure and a data item configuring tho data item, and the data item having the hierarchical structure is configured by one data item.

5. The computer-readable medium according to claim 1, the process further comprising: in the merge, deleting a code for declaration of a plurality of unused data items from the program; and adding code for declaration of a new data item.

6. The computer-readable medium according to claim 5, the process further comprising: setting an item length of the new data item based on item lengths of the plurality of unused data items to be merged.

7. The computer-readable medium according to claim 6, the process further comprising: when data types of a plurality of unused data items to be merged are all the same, setting a data type of the new data item to be the same as the data types of the plurality of unused data items to be merged.

8. The computer-readable medium according to claim 5, the process further comprising:
setting a data type of the new data item as having a smallest storage area.

9. The computer-readable medium according to claim 5, the process further comprising: setting as nameless an item name of the new data item.

10. The computer-readable medium according to claim 5, the process further comprising: setting an item name of the new data item based on any of the plurality of unused data items to be merged.

11. The computer-readable medium according to claim 1, the process further comprising: changing a layout of the data item in the memory based on a changed program.

12. The computer-readable medium according to claim 1, the process further comprising: deleting code for definition of an unused data item from a changed program.

13. A program optimizing method for optimizing a program, comprising: extracting data items from the program; laying out the data items in memory provided in the computer; extracting defined but unused data items from the extracted data items; determining whether or not a plurality of data items forming at least a part of a data item having a hierarchical structure in the unused data items can be merged into a new data item based on the layout result; and changing the program such that the plurality of data items are merged into the new data item based on the determination result, wherein the number of unused data items is reduced by merging a plurality of unused data items forming a data item having a hierarchical structure into one data item based on the hierarchical level in the hierarchical structure and the arrangement of the data items in the memory;

the program is optimized such that the necessary memory requirement during compilation or generation of a data item dictionary is reduced.

14. An optimizing apparatus for optimizing a program, comprising:

a computer comprising, a data item extraction unit extracting data items from the program; a layout unit laying out the extracted data items in memory; an unused data item extraction unit extracting defined but unused data items from the extracted data items; a merge determination unit determining based on the layout result whether or not a plurality of unused data items forming at least a part of a data item having a hierarchical structure in the unused data items can be merged into a new data item; and a data item merge unit outputting the program in which the plurality of data items are merged into the new data item, wherein the number of unused data items is reduced by merging a plurality of unused data items forming a data item having a hierarchical structure into one data item based on the hierarchical level in the hierarchical structure and the arrangement of the data items in the memory;

the program is optimized such that the necessary memory requirement during compilation or generation of a data item dictionary is reduced.

15. An optimizing apparatus for optimizing a program, comprising:

a computer comprising, data item extraction means for extracting data items from the program; layout means for laying out the extracted data items in memory; unused data item extraction means for extracting defined but unused data items from the extracted data items; merge determination means for determining based on the layout result whether or not a plurality of unused data items forming at least a part of a data item having a hierarchical structure in the unused data items can be merged into a new data item; and data item merge means for outputting the program by which the plurality of data items are merged into the new data item, wherein the number of unused data items is reduced by merging a plurality of unused data items forming a data item having a hierarchical structure into one data item based on the hierarchical level in the hierarchical structure and the arrangement of the data items in the memory;

the program is optimized such that the necessary memory requirement during compilation or generation of a data item dictionary is reduced.

16. A method of reducing a plurality of unused data items forming a data item having a hierarchical structure into one data item, the method comprising:

re-extracting defined but unused data items from extracted data items of a program layed out in a memory of a computer;

merging the re-extracted plurality of unused data items forming a data item having a hierarchical structure into one data item based on the hierarchical level in the hierarchical structure and the arrangement of the data items in the memory; and structure and the arrangement of the data items in the memory; and optimizing memory requirements for compiling or generating a data item dictionary by outputting a program in which the plurality of unused data items are merged into the new data item.

17. An apparatus for reducing a plurality of unused data items forming a data item having a hierarchical structure into one data item comprising:

a memory; and a processor, the processor extracting defined but unused data items from extracted data items of a program layed out in the memory of a computer, merging the re-extracted plurality of unused data items forming a data item having a hierarchical structure into one data item based on the hierarchical level in the hierarchical structure and the arrangement of the data items in the memory, and optimizing memory requirements for compiling or generating a data item dictionary and outputting a program in which the plurality of unused data items are merged into the new data item.

* * * * *

UNITED STATES PATENT AND TRADEMARK OFFICE
CERTIFICATE OF CORRECTION

| | | |
|---|---|---|
| PATENT NO. | : 7,213,243 B2 | Page 1 of 1 |
| APPLICATION NO. | : 10/669570 | |
| DATED | : May 1, 2007 | |
| INVENTOR(S) | : Masanori Kira | |

It is certified that error appears in the above-identified patent and that said Letters Patent is hereby corrected as shown below:

Column 20, Line 40, after "structure" delete "and a data item configuring tho data item,".

Column 22, Line 31-32, after "memory; and" delete "structure and the arrangement of the data items in the memory; and" (Repeated Lines).

Signed and Sealed this

Eleventh Day of March, 2008

JON W. DUDAS
*Director of the United States Patent and Trademark Office*